(12) United States Patent
Gardner et al.

(10) Patent No.: US 7,450,604 B2
(45) Date of Patent: Nov. 11, 2008

(54) METHOD AND APPARATUS FOR ESTABLISHING CIRCUIT CONNECTIONS OVER LOCAL AREA NETWORKS WITH FREQUENCY SELECTIVE IMPAIRMENTS

(75) Inventors: Steven H. Gardner, San Diego, CA (US); James E. Petranovich, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1069 days.

(21) Appl. No.: 10/422,014

(22) Filed: Apr. 21, 2003

(65) Prior Publication Data
US 2004/0081127 A1    Apr. 29, 2004

Related U.S. Application Data

(63) Continuation of application No. 09/044,644, filed on Mar. 18, 1998, now Pat. No. 6,567,122.

(60) Provisional application No. 60/374,315, filed on Apr. 20, 2002.

(51) Int. Cl.
    *H04J 4/00*    (2006.01)
(52) U.S. Cl. ....................... 370/436
(58) Field of Classification Search ............ None
    See application file for complete search history.

(56) References Cited

U.S. PATENT DOCUMENTS

| 5,625,875 | A | * | 4/1997 | Whinnett et al. ............ 455/513 |
|---|---|---|---|---|
| 5,633,678 | A | | 5/1997 | Parulski et al. ............... 348/232 |
| 5,649,186 | A | | 7/1997 | Ferguson ....................... 707/10 |
| 5,999,207 | A | | 12/1999 | Rodriguez et al. ............. 348/14 |
| 6,012,088 | A | | 1/2000 | Li et al. ........................ 709/219 |
| 6,035,323 | A | | 3/2000 | Narayen et al. ............... 709/201 |
| 6,163,335 | A | | 12/2000 | Barraclough ................. 709/231 |
| 6,169,569 | B1 | * | 1/2001 | Widmer et al. ............... 725/111 |
| 6,205,485 | B1 | | 3/2001 | Kikinis ......................... 709/231 |
| 6,246,430 | B1 | | 6/2001 | Peters et al. ................... 348/14 |
| 6,353,848 | B1 | | 3/2002 | Morris ......................... 709/203 |
| 6,377,549 | B1 | * | 4/2002 | Ngo et al. ..................... 370/233 |
| 6,885,640 | B2 | * | 4/2005 | Pinola .......................... 370/241 |
| 7,042,897 | B1 | * | 5/2006 | Sivaprakasam et al. ...... 370/462 |
| 2001/0010543 | A1 | | 8/2001 | Ward et al. .............. 348/207.99 |
| 2001/0014910 | A1 | | 8/2001 | Bobo, II ....................... 709/217 |
| 2001/0050711 | A1 | | 12/2001 | Karube et al. ................ 348/220 |
| 2002/0183010 | A1 | * | 12/2002 | Catreux et al. .............. 455/67.1 |
| 2003/0021245 | A1 | * | 1/2003 | Haumonte et al. ........... 370/330 |

FOREIGN PATENT DOCUMENTS

| EP | 0 821 522 | 2/1998 |
|---|---|---|
| WO | WO 96/02106 | 1/1996 |
| WO | WO 97/38510 | 10/1997 |

\* cited by examiner

*Primary Examiner*—Edan Orgad
*Assistant Examiner*—Blanche Wong
(74) *Attorney, Agent, or Firm*—Jackson Walker L.L.P.; Christopher J. Rourk

(57) ABSTRACT

Local area network bandwidth is partitioned into periodic data frames. Data frames are further segregated into spectrum and time slots. Bandwidth reserved by assigning spectrum and time slots to particular circuit connections; enabling deterministic data transfer from source to destination nodes. Bandwidth reservations are broadcast to nodes attached to network.

39 Claims, 23 Drawing Sheets

METHOD AND APPARATUS FOR ESTABLISHING CIRCUIT CONNECTIONS OVER LOCAL AREA NETWORKS WITH FREQUENCY SELECTIVE IMPAIRMENTS

CROSS-REFERENCE TO RELATED APPLICATIONS

This application is a Continuation application of U.S. patent application Ser. No. 09/044,644, entitled "Method and System For Hosting An Internet Web Site On A Digital Camera," filed on Mar. 18, 1998 now U.S. Pat. No. 6,567,122.

RELATED APPLICATIONS

This present application is related to a provisional application Ser. No. 60/374,315 filed on Apr. 20, 2002, entitled "METHOD AND APPARATUS FOR ESTABLISHING CIRCUIT CONNECTIONS OVER LOCAL AREA NETWORKS WITH FREQUENCY ELECTIVE IMPAIRMENTS", by APPLICANT, for which the priority date for this application is hereby claimed.

FIELD OF THE INVENTION

This invention relates generally to network protocols and specifically to a method and apparatus for network bandwidth reservation on channels that may be degraded by frequency selective impairments.

BACKGROUND OF THE INVENTION

Local area networks take on many forms. A typical local area network (LAN) uses data packets to transfer data between nodes attached to the network. Using data packets to transfer data has proven to be an efficient means of allocating the available bandwidth of a network among a plurality of nodes. In most environments, the use of data packets to transfer data is an effective mechanism because of the nature of the data traffic carried by the LAN.

Data-packet-based network protocols are well suited to local area networks that service offices and wide area networks such as the Internet. This is because the data transferred between computing devices attached to these types of networks may be fragmented and delivered without worry as to the order of delivery or latency associated with propagating any given data packet through the network. So long as all of the data packets arrive at a destination node, they may be reassembled into coherent data.

Home networking is a newly emerging field. One objective in home networking is to allow various computing and entertainment devices to be connected to each other. Once these devices are connected to each other, informational data and entertainment content may be shared amongst various devices attached to the home network. Home networking users may want to transfer files between computers or share peripherals such as printers. In other situations, home networking users may want to access gateways to broadband service so they can share a single Internet connection amongst various devices. Home networking will most certainly be used for other services such as voice-over-IP (VoIP) and streaming media for entertainment.

Because the expectation of a household network user is so different than that of a typical office user, the nature of the data traffic pattern exhibited by a typical home networking structure is significantly different from other networking environments so far known. One such difference may be attributed to entertainment content flowing through the home networking structure.

Entertainment content must usually arrive at a destination node in proper sequence. In many situations, the latency between various streams of entertainment content must also be controlled. In some situations, some latency may be accommodated so long as the latency is deterministic and bounded by some reasonable maximum. Hence, it may not be appropriate to use data-packet-based network protocols in a home networking environment because of data fragmentation and the possibility that a data stream carrying entertainment content may arrive at the destination node either out-of-sequence or with excessive or non-deterministic latency.

The physical implementation of a home networking structure may also take on various forms. In some newer housing structures, Cat 5 or fiber cable may be available to connect computer and entertainment devices together. However, only the most modern houses may be pre-wired in this fashion. Because of this, the field of home networking has embraced alternative methods of connecting devices to each other. In some home networking systems, computer and entertainment devices may be connected to each other using power or telephone wiring. In yet other home networking implementations, a wireless communications scheme may be employed.

These three candidate transmission mediums, wireless, power wiring and phone wiring, each provide a much harsher environment for communication than cables designed specifically for networking (such as Cat 5). In particular, these three mediums are each subject to frequency selective impairment, wherein the signaling path between two nodes might support high-speed communications at some frequencies, but at other frequencies the ability to communicate might be poor or altogether lacking.

Most home networking systems rely on well-established, data-packet oriented transfer protocols. One such protocol is the well-known Transmission Control Protocol/Internet Protocol (TCP/IP). The TCP/IP protocol can use various physical communications medium. For instance, the TCP/IP protocol may be used in conjunction with Ethernet carried by copper cable. The TCP/IP protocol may also be used with a wireless physical layer. A power line based physical layer may also be used to support TCP/IP.

In networking terminology, the physical medium is controlled and accessed by a physical layer component. The physical, or "PHY" component may comprise hardware that enables higher levels of networking protocols to access the physical medium. The PHY component, which defines the method of attaching to the medium and the transfer of data packets, is typically augmented with a media access control (MAC) component. In some situations, the MAC component may be tightly coupled with the hardware that comprises the PHY component. The two may operate collectively to support access to the medium by higher levels of networking protocols.

Through evolution, the PHY/MAC components of various types of communications medium have been tailored to support transfer of fragmented data. And in some cases, the PHY/MAC components may actually exploit the fact that data may be fragmented into smaller data packets. One such exploitation is the notion of allowing collisions to occur when two or more devices attached to the medium attempt to transmit simultaneously. An example of this is the Carrier Sense, Multiple Access—Collision Detection (CSMA/CD) physical access method used in Ethernet PHY/MAC components.

Because data is fragmented into smaller data packets, it is easier to tolerate retransmission of data packets lost as a result of collisions.

Home networking systems that use a CSMA/CD access method may work just fine if the data traffic pattern carried by the network were to more closely resemble that of an office environment. The problem is that a home networking system must be capable of carrying not only informational data, but entertainment content as well. Because entertainment content should be delivered in proper sequence and with controlled latency, CSMA/CD PHY access may be an inappropriate mechanism to impart the entertainment content onto the physical networking medium.

An isochronous channel may be better suited for transferring entertainment content from one node in a home networking environment to another. By definition, an isochronous channel ensures sequential delivery of a data stream at a controlled rate, and with deterministic latency. Most home networking systems cannot support isochronous transfer because they rely on traditional data-packet oriented transfer protocols and their PHY/MAC access methods.

Many known home networking systems use the power lines that service convenience outlets in a home as the physical medium between data and entertainment nodes. This is because power outlets are usually found everywhere someone might want to use a networked device. In one known power-line based system, the PHY component uses orthogonal frequency division multiplexing (OFDM) as the basic transmission technique. In one system, the OFDM access method is used on a transient basis to support varying levels of communications bandwidth.

Some home networking systems that use OFDM media access also utilize a MAC protocol that is a variant of the well-known carrier sense multiple access with collision avoidance (CSMA/CA) protocol. The CSMA/CA protocol is typically used in wireless LAN systems and relies on the use of a jamming signal that is used to detect collisions. Several variations to the classic CSMA/CA protocol may be found in some MAC components. The most common enhancements provide support for priority classes, fair access, and controlled latency. The use of CSMA/CA means the PHY must support burst transmission and reception; that is, each client enables its transmitter only when it needs to send data.

OFDM divides a high-speed data stream, such as entertainment content, into a plurality of parallel bit streams, each of which has a relatively low bit rate. Each individual bit stream may then be used to modulate one of a series of closely spaced carriers. The carriers are spaced so that they do not interfere with each other and the spacing between carriers is dictated by the bit rate of the modulating data.

Many different modulation techniques may be applied independently to the individual carriers. In some systems that use power lines as the communications medium, the quality of the power line as a communications medium may be assessed and a modulation technique may be selected for each carrier based on a realistically sustainable modulation density at the carrier frequency over the medium between two nodes.

In some power line based home networking architectures, the same transmitting node may not necessarily use all of the available carriers simultaneously. This means that a plurality of devices attached to the network medium, i.e. to the household electrical or phone wiring, may contend for the same communications resources and that some or all of these contenders will be able to acquire some portion of those resources. In these PHY/MAC embodiments, a plurality of network devices may simultaneously transmit data.

Home networking structures that incorporate PHY/MAC components that comprise OFDM media access with enhanced CSMA/CA protocol still continue to operate under the traditional packetized data paradigm. As a result, entertainment data streams may not have continuous or deterministic access to the communications medium. After every packet is sent, network bandwidth used for entertainment streams must be relinquished. Once the bandwidth is released, it may not be available for a subsequent data packet because of other devices attempting to transmit their data packets. This may result in additional latency because each subsequent attempt to continue transmission of the entertainment data stream will require a contest for available communications resources. The number of carriers available to convey data may vary over time as other nodes on the network capture resources or portions of the available communications spectrum suffer temporal impairments.

Local area networks take on many forms. A typical local area network (LAN) uses data packets to transfer data between nodes attached to the network. Using data packets to transfer data has often proven to be an efficient means of allocating the available bandwidth of a network among a plurality of nodes. In many network environments, the use of data packets to transfer data is an effective mechanism because of the nature of the data traffic carried by the LAN.

Packet-based network protocols are well suited to local area data networks that service offices and to wide area networks such as the Internet. Packet protocols are very useful for transfer of computer data in such networks for several reasons. First, the bandwidth demand for computer data tends to be highly variable and unpredictable, and moreover there is flexibility to trade off bandwidth against delay in delivering the data. Second, packet protocols are very useful in large networks where data can reach its destination via multiple paths. In a packet system, each packet can be routed via a path that has the most available bandwidth at the time of routing. This routing efficiency makes packet delivery desirable even for fixed bandwidth services such as telephony. Data transferred between computing devices attached to these types of networks may be fragmented into packets and delivered successfully even when packets arrive out of order or are subject to substantial latency associated with propagating any given data packet through the network. So long as all of the data packets arrive at a destination node, they may be reassembled into coherent data. Office and wide area networks typically are not used for applications with extreme sensitivity to the delay encountered by the data being transmitted. Moreover, the medium that carries the network usually has ample bandwidth for the application, and if the bandwidth does become constrained, the medium can be expanded to provide more by a variety of techniques.

To summarize, there are four key attributes of packet systems in relation to the office environment that should be considered with respect to the use of such systems for home networking. These attributes are:
1. The bandwidth required to support the intended applications varies rapidly over time.
2. The intended applications are relatively insensitive to substantial latency in delivery of the data.
3. There is substantial efficiency to be gained in dynamic routing of packets via the best of many possible paths.
4. Bandwidth on the physical medium is relatively inexpensive, and more can be added at relatively low cost if needed.

Home networking is a newly emerging field. Early home networks have been used to provide computer-oriented capabilities in the home similar to those that users have become accustomed to at work. These include file sharing, peripheral sharing, and sharing access to the Internet via a gateway. But in the next generation of home networking, bandwidth requirements will be dominated by entertainment applications, and these applications have very different requirements and behavior compared to computer data.

Because the applications for a household network are so different from those of a typical office network, the nature of the data traffic pattern exhibited by a typical home networking structure is significantly different as well. By comparison to the four key attributes of the office environment, a home network designed to carry entertainment traffic has the following characteristics:

1. The majority of the traffic in the home network has a fixed bit rate.
2. The majority of the traffic in the home network is intolerant of large latency.
3. There is only one routing path, so the efficiency gains in packet routing do not exist.
4. Bandwidth is a scarce resource with a definite limit.

Entertainment content is almost always transmitted at a fixed bit rate. A standard definition digital television channel might require a 6 Mbps connection. A high definition digital television channel might require 24 Mbps. A CD audio connection requires about 1.5 Mbps. These requirements do not change for the duration of the application. This is in stark contrast to a computer application like web surfing, where there is no bandwidth requirement while the user is reading a web page, and then suddenly a high demand when he clicks on a link.

Entertainment content is also typically very sensitive to delay. If a video frame is not delivered in time, the video display has no information to show, and the screen must either be blanked or the display unit must rely on some other algorithm to estimate the missing data. Either of these events cause undesirable artifacts in the image displayed. In addition, audio and video must be synchronized in time so that sound and motion appear coordinated, requiring that the delay difference between the audio and video information carried on the network must be controlled. Networks that carry video and audio data typically include elastic buffers (memory) that smooth out some degree of variation in delivery time, but to tolerate long delays, the memory needed is very large, and the cost of this memory is prohibitive. What is more, the total delay allowed must still be small enough so that the system seems responsive when the user changes channels.

This extreme sensitivity to latency suggests that it may not be appropriate to use packet-based network protocols in a home networking environment because these protocols typically have potentially large and unpredictable latencies.

The physical implementation of a home networking structure may also take on various forms. In some newer housing structures, Cat 5 or other network cable may be available to connect computer and entertainment devices together. However, only the most modern houses may be pre-wired in this fashion. Because of this, the field of home networking has embraced alternative methods of connecting devices to each other. In some home networking systems, computer and entertainment devices may be connected to each other using power or telephone wiring. In yet other home networking implementations, a wireless communications scheme may be employed.

These three candidate transmission mediums, wireless, power wiring and phone wiring, each provide a much harsher environment for communication than cables designed specifically for networking (such as Cat 5). In particular, these three mediums are each subject to frequency selective impairment, wherein the signaling path between two nodes might support high-speed communications at some frequencies, but at other frequencies the ability to communicate might be poor or altogether lacking.

Regardless of the quality of the path, there is only one route available for the data to take on any of these three types of medium. Thus a packet based protocol does not accrue any advantage from routing efficiency.

In each of the three of the potential media for home networking, there is a limit to how much bandwidth is available. In each case the limit results from regulation on spectrum usage. For a power line system, the usable bandwidth lies below 30 MHz, and there are many segments of this band that must be avoided to prevent interference with other licensed radio services. The net result is that there is on the order of 23 MHz of useful bandwidth. A home network that supports entertainment must be able to provide about 50 Mbps of aggregate bandwidth to the application layer while operating confined to this band. This requires a much greater bandwidth efficiency than any current office network can achieve.

Most home networking systems rely on well-established, data-packet oriented network layer protocols. One such protocol is the well-known Transmission Control Protocol/Internet Protocol (TCP/IP). The TCP/IP protocol can use various physical communications medium. For instance, the TCP/IP protocol may be used in conjunction with Ethernet carried by copper cable. The TCP/IP protocol may also be used with a wireless physical layer. A power line based physical layer may also be used to support TCP/IP.

TCP/IP is a general-purpose protocol that can be used on many networks, but to use it on different media such as power line, phone line or wireless requires that it interface to lower layer protocols designed specifically for these media. These lower layer protocols typically consist of two component protocols, a physical layer (PHY) protocol that determines the modulation, coding and signal format to be used to transmit information on the wire, and a medium access control (MAC) protocol that controls how the medium is accessed and shared by the various network nodes. In some cases the MAC may also provide capability to detect and correct transmission errors. The MAC component may be tightly coupled with the hardware that comprises the PHY component. The two layers operate collectively to support access to the medium by higher levels of networking protocols.

Through evolution of networking technology, the PHY/MAC components of many types of communications networks have been tailored to support transfer of packet data. A common approach to transmission of packet data is the Carrier Sense, Multiple Access—Collision Detection (CSMA/CD) physical access method used in Ethernet PHY/MAC components. In this scheme, a set of rules govern the time at which devices may attempt transmission with the intent of reducing, but not eliminating, the chance of a packet collision—that is, the event where two or more nodes attempt to transmit at the same time. When a collision occurs, the data transmitted is typically not received by the intended destination. Packets may also be lost due to impairments that degrade the channel. Lost packets are typically recovered by having the destination acknowledge packets that are received. The source then retransmits packets that are not acknowledged.

Because transmission times are not coordinated among the network nodes, collision events happen at unpredictable times and the amount of time expended in recovering lost packets is also unpredictable. Moreover, even when there is no collision, a node may have to wait an unpredictable amount of time for the medium to be released by another node, and thus encounters a variable delay.

The CSMA/CD method works very well for computer data where variability in delay is tolerable. It is not uncommon for delays in LANs for computer data to be as low as a few microseconds or as large as half a second. The user of the network typically doesn't notice these short-term fluctuations in delay as long as the overall throughput is good. The protocol is effective at providing reasonably good long-term throughputs, and it is very simple and cost effective to implement. But a CSMA/CD protocol typically wastes a substantial percentage of the available bandwidth as nodes wait to access the channel for various amounts of time chosen to minimize the chances of collision.

Home networking systems that use a CSMA/CD access method may work well if the data traffic pattern carried by the network resembles that of an office environment. But a home networking system must be capable of carrying not only computer data, but entertainment content as well. Because entertainment content must be delivered with controlled latency, CSMA/CD PHY access may not be the best choice for a medium access control protocol.

In addition to these latency and efficiency problems, it is difficult to use a CSMA protocol with bandwidth efficient modulations such as high order quadrature amplitude modulation (QAM). Use of QAM can allow transmission rates of many bits per second per Hz—prior art systems such as ADSL use QAM to achieve as much as 10 bits per second per Hz or more. However, high order QAM modulations require that the modem receiver must track the correct sampling time, carrier phase, and signal amplitude with extremely good accuracy. Obtaining this accuracy typically requires a long initial training time. But in a packet system where the source of the packet is not known a priori, the receiver must train on each packet received individually without use of knowledge derived from prior receptions. To support high order QAM, each packet would thus have to include a long training sequence (that is, a known signal that can be used to form an estimate of timing, phase and amplitude). The overhead introduced by this training sequence typically consumes most of the bandwidth savings achieved by using the higher order modulation, so that there is no improvement to be gained.

ADSL is able to use high order QAM because it uses a circuit type of connection. The modem acquires timing, phase and amplitude estimates during a training period when the connection is first established and then continues to track these parameters throughout the data transmission. In home networking with entertainment content, establishing circuit connections can also provide the ability to support high order QAM modulation. But unlike ADSL where the medium is used to connect only two devices, the network medium must connect multiple devices and thus must support the establishment of multiple circuit connections simultaneously. This can be achieved through well known schemes such as Time Division Multiple Access (TDMA), Frequency Division Multiple Access (FDMA), Code Division Multiple Access (CDMA) or combinations of all three.

Historically, the term "circuit" meant that there was a single wire dedicated to carrying the data to be transferred between two nodes and that the capacity of this wire was unavailable to any other nodes while the transfer was in progress. More recently, the word "circuit" has come to describe a connection that provides a known and constant amount of data carrying capacity in a way that appears to provide continuous availability of the channel to the applications that are exchanging data. For example, a "virtual circuit" can be provided over a medium in which time is divided into intervals and a fixed slot of time and bandwidth in each interval is provided to the applications. Other applications can be allocated other time slots and/or bandwidth so that multiple virtual circuits can be supported simultaneously by a single wire. The key attribute of a circuit connection as the term is used herein is that the connection provides the application with a constant throughput capability that does not vary as other data traffic is added or removed from the network, and that this is done by reserving access to the channel at appropriate times and frequencies for the exclusive use of the nodes using the circuit.

When OFDM is used on a circuit connection, even if the circuit connection is not continuous in time, the fact that the times at which the signal will be present are predictable allows the receiver to use information about the signal obtained during previous transmissions (such as the appropriate receiver gain, symbol timing, carrier phase and frequency) to assist in demodulation of subsequent transmissions. This vastly improves the ability to support denser modulations and thus provide more efficient use of the available bandwidth.

Home networking systems that use the power wiring in a home as the physical medium between data nodes are currently available on the consumer market. This approach to home networking is attractive because power outlets are is usually found virtually everywhere someone might want to use a networked device. In one known power-line based system developed by the HomePlug PowerLine Alliance consortium, the PHY component uses orthogonal frequency division multiplexing (OFDM) as the basic transmission technique. In this system, the OFDM signaling is used in combination with a packet based MAC protocol that is a variant of the well-known carrier sense multiple access with collision avoidance (CSMA/CA) protocol. Several variations to the classic CSMA/CA protocol may be found in some MAC components. The most common enhancements provide support for priority classes, fair access, and controlled latency. The use of CSMA/CA means the PHY must support burst transmission and reception; that is, each client transmits its data in limited duration transmissions and then frees the channel for contention by other nodes. OFDM divides a high-speed data stream, into a plurality of parallel bit streams, each of which has a relatively low bit rate. Each individual bit stream may then be used to modulate one of a series of closely spaced carriers. The bits in these individual streams are formed into symbols, with the number of bits in a symbol being the same for each symbol transmitted by a particular carrier, but not necessarily the same for different carriers. The symbol rate for all the carriers is the same, but the bit rate supported by each carrier is the product of the symbol rate and the number of bits per symbol, and thus may be different for each carrier. The number of bits per symbol is called the modulation density and is a function of the quality of the channel at each carrier frequency. Generally speaking, better channel quality allows the use of a greater number of bits per symbol and thus allows greater efficiency in bandwidth utilization. Channel quality is determined by a variety of factors, including, but not limited to, signal-to-noise ratio and distortion due to the channel response.

The carriers are spaced so that they do not interfere with each other and the spacing between carriers is dictated by the symbol rate. This approach to modulation is advantageous for channels where the degradation encountered by the signal varies substantially as a function of frequency, as is the case for the wireless, phone line, or power line channels. The modem can transmit data at a higher bit rate on carriers in frequency bands that have better quality by using denser modulation constellations. Thus the network can be rate adaptive, matching the overall bit rate to the quality of the channel.

Many different modulation techniques may be applied independently to the individual carriers. In some systems that use power lines as the communications medium, the quality of the power line as a communications medium may be assessed and a modulation technique may be selected for each carrier based on a realistically sustainable modulation density at the carrier frequency over the medium between two nodes.

In one existing power line based home networking architecture (HomePlug v1.0), if the channel is unusable with any modulation density for transmission between two nodes at the frequencies occupied by certain carriers, these carriers are not used to bear data. In this example architecture, while the two nodes are communicating no other nodes may make use of these unused carriers, even if the channel at those frequencies is capable of supporting transmission between these other nodes. This causes a substantial inefficiency in the usage of the available bandwidth and reduces the capacity of the network from what might otherwise be possible.

Home networking structures that incorporate PHY/MAC components that comprise OFDM media access with enhanced CSMA/CA protocol still continue to operate under the traditional packet data paradigm. As a result, in these systems entertainment data streams do not have continuous or deterministic access to the communications medium. After every packet is sent, network bandwidth used for entertainment streams must be relinquished. Once the bandwidth is released, it may not be available for a subsequent data packet because of other devices attempting to transmit their data packets. This may result in additional latency because each subsequent attempt to continue transmission of the entertainment data stream will require a contest for available communications resources. The number of carriers available to convey data may vary over time as other nodes on the network capture resources or portions of the available communications spectrum suffer temporal impairments.

Existing packet based technologies for home networking using either wireless, phone line or power line as the medium all suffer from two major shortcomings: first, the efficiency of bandwidth utilization is so poor that the available bandwidth is insufficient to support transport of high bit rate entertainment content such as high definition TV signals, and second the latency of delivery of data is inadequate. These two drawbacks make existing systems ineffective for distributing entertainment content.

What is needed then is an approach to networking that is specifically designed with the intent of carrying entertainment content and that specifically addresses the issues of bandwidth utilization and latency. The invention described herein does this.

SUMMARY OF THE INVENTION

The present invention comprises a method for establishing circuit connections over a local area network. This invention may be applied to any type of local area network, but is most beneficially applied to networks susceptible to frequency-selective impairments. It should be noted that the method and apparatus comprising the present invention should not be limited in scope to any particular application.

According to one example method of the present invention, networking bandwidth may be reserved to specific connections formed between a source node and a destination node attached to a networking medium. By establishing these bandwidth reservations, a more deterministic access profile may be provided to network users. Reserved bandwidth access according to this invention may be used to support transfer of information such as entertainment content streams and other data comprising isochronous data traffic. Likewise, any type of data may be conveyed from a source node to a data node using the technique described here.

According to one illustrative embodiment of the present invention, a method for establishing circuit connections over a network may be achieved by first discovering any existing allocation of network resources. In operation, the method of the present invention provides that the assignment of networking resources to newly formed circuit connections be broadcast to other nodes attached to the network. By monitoring these broadcasts, any node attached to the medium may determine what networking resources are still available and can support new circuit connections. A new circuit connection may be formed by reserving a portion of any remaining network resources and associating that reservation with the circuit connection. Once networking resources are selected and assigned to a new circuit connection, these assignments may then be broadcast to other nodes attached to the network. This enables other nodes to avoid contention when new circuit connections are subsequently formed.

In many networking environments, establishing circuit connections may be problematic because the networking medium may be susceptible to frequency-selective impairments. In the case of a home networking structure, the networking medium may be a wireless connection or it may be AC power or telephone wiring. In all of these cases, the networking medium may be subject to ingress noise that may affect the fidelity of any circuit connection that needs to be established. In one illustrative method of the present invention, a transfer function profile for the medium may be created. By determining the transfer function profile from a particular source node to a particular destination node, a more reliable circuit connection may be established because the data carrying capacity of the networking medium may be determined for a specific path.

In this example method, establishment of a circuit connection may be predicated on the creation of a resource allocation profile. The resource allocation profile typically describes the availability of networking resources in terms of the assignment of network spectrum and time-slots to particular circuit connections that may have been previously established.

When a new circuit connection needs to be established, the illustrative method of the invention presented here suggests that a portion of the remaining available networking resources, as described in terms of spectrum and time-slots, be selected and assigned to the new circuit connection. The new selection of spectrum and time-slots that have been assigned to the new circuit connection may then be broadcast to other nodes attached to the networking medium.

In one variation of a method according to the present invention, establishing a circuit connection may further comprise the broadcast of a circuit connection identifier. This circuit connection identifier may be used by other nodes attached to the networking medium to correlate reservation of spectrum and time-slots to particular circuit connections. A node that needs to transmit information to a destination may receive data from some computer readable media. A node may receive information either from an external source or information may be stored on computer readable media integral to the node. In either case, this source data may be used to modulate a set of carriers that ultimately carry the information to a destination node. Once the carriers are modulated, they may be conveyed to the networking medium. In one illustrative method, the carriers are modulated according to an established modulation density dictated by a transfer function profile that describes the fidelity of the medium between the source and destination nodes.

Receiving information in a destination node according to one illustrative method of the present invention may comprise first receiving information about a particular circuit connection. This may comprises the selection of spectrum and time-slots that may have been assigned to the particular connection from which data must be received. In some embodiments, the receiving node may accept a circuit connection identifier. The circuit connection identifier may aid the receiving node to identify specific carrier frequencies and time-slots from the original selection of spectrum and time slots that the receiving node may have received. The receiving node may further demodulate each of these specific carriers in order to recover the information that they carry. Each specific carrier may be demodulated in accordance with an established modulation density for each specific carrier. The established modulation density may typically be dictated by a transfer function profile that describes the fidelity of the medium between the source and destination nodes.

The fidelity of any networking medium may vary with time. To accommodate such variations, an example method for establishing circuit connections may further comprise steps for periodically updating the transfer function profile that describes the fidelity of the networking medium from a source node to a destination node. Any existing reservation of networking resources for a particular circuit connection may then be evaluated in light of the updated transfer function profile. If a more advantageous selection of network resources appears probable, the existing selection of spectrum and time-slots for the circuit connection may be abandoned and replaced with a new selection of spectrum and time-slots. In order to prevent a constant reconfiguration of resource assignments among the various circuit connections that may have been established over a LAN, an efficiency threshold defines the amount of advantage that must be realized before circuit connections are restructured.

According to one illustrative method of the present invention, the transfer function profile between a data source node and a data destination node may be determined by first sending a sounding message from the data source node to the data destination node. The quality of the sounding message may then be measured as it arrives at the data destination node. In some embodiments, the quality of the sounding message received in the data destination node may dictate a maximum modulation density that may be realistically sustained by carriers operating at various frequencies.

In yet another variation of this illustrative method, determining the transfer function profile may also require the identification of impairments that can arrive at the data destination node collectively with the sounding message. In these cases, impairments may be categorized as either narrow-band interferes or wide-band interferes. According to this variation of one illustrative method, carriers operating at frequencies that are imposed upon by narrow-band interferes may be avoided by setting their established modulation density to a nil value. The reason for this severe response lies in the acknowledgment that narrow-band interferes may present a real obstacle to successfully conveying information using carriers operating at the offending frequencies.

Wide-band interferes are more likely to be temporary phenomenon. Because of this, when a wide-band interferer is detected, the channel from the data source node to the data destination node may be reevaluated by sending an additional sounding message. If a wide-band interferer is again detected by the destination node, the modulation density established through the first sounding process for those carriers operating at frequencies enveloped by the wide-band interferer may represent the maximum effective data carrying capacity of those carriers in the presence of the impairment. In the event that a wide-band interferer desists, one variation of an illustrative method comprising the invention may allow the modulation density established through the first sounding message to be upgraded.

In order to ensure that all nodes attached to a network remain cognizant of current networking resource reservations, each node maintains a profile of spectrum and time-slots allocations to particular circuit connections. Each node initially creates an allocation profile table when it receives a beacon signal. The beacon signal may comprise an enumeration of the total spectrum and time-slots that may be supported by the networking medium. The beacon signal may also comprise associations of portions of the total spectrum and time-slots to particular circuit connections carried by a LAN. According to this illustrative method, each node attached to the networking medium may continuously update its own allocation profile table as subsequent beacon signals are received.

In most applications of the method of the present invention, circuit connections are typically established based on a minimum aggregate throughput that must be conveyed from a source node to a destination node. In support of this, the method of the present invention provides that, in certain embodiments, the act of selecting a portion of the available spectrum and time-slots for transferring information to a destination node comprise a first step of receiving a required data bandwidth indicator. Once the data bandwidth indicator is received, the method of the present invention provides for the selection of one or more carriers from a set of carriers identified in the resource allocation profile as being available.

According to yet another illustrative embodiment, an established modulation density may be used to determine the number of carriers needed and the time-slots required from each carrier to support the aggregate data bandwidth as indicated by the required bandwidth indicator. The established modulation density, which results from profiling the transfer function from the source node to the destination node, indicates the amount of data bandwidth each specific carrier is capable of sustaining as it is propagated through the networking medium.

According to one variation of the illustrative method described here, the step of broadcasting selection of spectrum and time-slots to other nodes when new circuit connections are established may be accomplished by creating a beacon signal comprising the current selection information. The beacon signal may then be conveyed to the networking medium on a periodic basis. In some embodiments, new resource allocations may first be combined with the contents of a resource allocation table maintained within a particular node. Once the resource allocation table is updated to reflect the newly reserved networking resources, it may be used as the basis of a beacon signal that can then be conveyed to the networking medium. In some embodiments of the present invention, the resource allocation table may be updated periodically in response to beacon signals received from the network and beacon signals may be transmitted with the same periodicity.

The present invention also comprises an apparatus that embodies the methods described herein. One such apparatus may be a networking control unit. Such a networking control unit may be designed into a node. A node comprising a networking control unit may then be attached to a networking structure enabling conveyance of information across the network using circuit connections.

In one example embodiment of a networking control unit (NCU), a PHY/MAC that comprises the NCU enables either connection to a physical medium or wireless propagation of networking signals. The NCU also comprises a resource allocation tracking unit. The resource allocation tracking unit maintains a resource allocation profile table. The resource allocation profile table is typically used to maintain a perception of current network resource reservations. The resource allocation tracking unit, according to this illustrative embodiment of the invention, updates the resource allocation profile table in response to allocation messages that it receives from the PHY/MAC. These are typically generated by the PHY/MAC when it recognizes a beacon signal on the networking medium.

The beacon signal may comprise correlations of circuit connection to specific carrier frequencies and time-slots that may be used for each carrier frequency. The NCU may further comprise a resource usage broadcast unit. The resource usage broadcast unit may generate a beacon signal from the resource allocation profile table maintained by the resource allocation tracking unit. The resulting beacon signal may be conveyed to the PHY/MAC so as to convey the signal to the networking medium.

The NCU also comprises a host data interface. The host data interface provides a portal for the NCU to communicate with a host device. When a host device requires a new circuit connection, it may communicate a destination address to a circuit connection establishment unit that also comprises the NCU. This destination address may be conveyed to the circuit connection establishment unit by means of the host data interface. The circuit connection establishment unit may typically determine the transfer function for the networking medium from a source node through to a destination node. This process may be referred to as "sounding" or "profiling" the medium.

The circuit connection establishment unit may further comprise a sounding unit that typically sends a sounding message from a source node, i.e. the node that the NCU is installed in, and a destination node. The destination node may comprise an NCU that has been programmed to respond to a particular destination address. The sounding unit may further comprise a medium analysis unit that is capable of receiving a quality message from the destination node and establishing a modulation density for each carrier frequency that the medium can propagate.

The present invention comprises a method for establishing circuit connections over a local area network. This invention may be applied to any type of local area network, but is most beneficially applied to networks susceptible to frequency-selective impairments. This invention is particularly targeted towards the application of distribution of digitized audio and video content on AC electrical power wiring within homes, but it should be noted that the method and apparatus comprising the present invention should not be limited in scope to any particular application and that the inventors in fact anticipate its use in many types of networks operating on many different communication channel media.

According to one example method of the present invention, networking resource allocations may be reserved to specific connections formed between a source node and a destination node attached to a networking medium. Networking resource allocations typically are comprised of specific frequency bands (referred to as "frequencies") and times (referred to as time slots) that are reserved for communication between a pair of nodes on the network. By establishing these resource reservations, deterministic access to the network may be provided to network users. Reserved access according to this invention may be used to support transfer of information such as streams of digitized entertainment content and other data comprising isochronous or asynchronous data traffic. Likewise, any type of data may be conveyed from a source node to a data node using the technique described here.

According to one illustrative embodiment of the present invention, a network node begins the process of establishing a circuit connection by first determining any existing allocation of network resources and creating a resource allocation profile of existing frequency and time slot allocations in use on a medium. Each node generates and maintains a resource allocation profile such that all nodes attached to the network share a common understanding of the usage of network resources at any time. In operation, the method of the present invention provides that the assignment of networking resources to newly formed circuit connections be communicated to other nodes attached to the network. By monitoring these communications, any node attached to the medium may determine what networking resources are still available and can support new circuit connections.

A new circuit connection may be formed by selecting a portion of the available frequencies and time slots from the resource allocation profile to be reserved for transmitting information from a source node to a destination node and associating that reservation with the circuit connection. Once networking resources are selected and assigned to a new circuit connection, these assignments may then be communicated to other nodes attached to the network. This enables other nodes to avoid contention when new circuit connections are subsequently formed.

The resource allocation profile can be generated by a node in many ways. According to one example method of the current invention, a frequency and time slot allocation profile may be received from a node attached to the network. This profile may contain information about all of frequencies and time slots reserved by the network. In this case, the resource allocation profile might be completely determined from the information in the frequency and time slot allocation profile.

In another example, an individual frequency and time slot reservation message may be received from a node. The resource allocation profile in this case might be determined from the information contained in a plurality of such messages, each of which describes one reservation.

In another example of the current method, a pseudo-composite frequency and time slot profile may be received from a node attached to the medium. The pseudo-composite frequency and time slot profile may contain partial or complete information about resource allocations currently in force on the network, and the resource allocation profile is determined by aggregating the information from pseudo-composite frequency and time slot profiles received from a plurality of nodes.

In yet another example of the current method, the resource allocation profile may be determined from observations of the usage of the medium by other nodes attached to the medium.

In many networking environments, establishing circuit connections may be problematic because the networking medium may be susceptible to frequency-selective impairments. In the case of a home networking structure, the networking medium may be a wireless connection or it may be AC power or telephone wiring. In all of these cases, the networking medium may be subject to frequency selective degradation of the transmitted signal. Degradation may take the form of attenuation of the signal by varying amounts, distortion of the signal, or the addition of frequency selective noise and interference to the signal. The nature of the signal degradation between any two nodes is often specific to those two nodes; that is, a frequency where substantial degradation occurs for communications between one pair of nodes may provide relatively little degradation for communications between another pair of nodes. Since the throughput that can be supported on any communication channel is a function of the degradation that the channel causes to the signal, if channel resources are assigned in a way that allows each pair of nodes to communicate on the set of available frequencies that provide the least degradation, the aggregate network throughput will be maximized. In one example of the present invention, the selection of a portion of the available frequencies and time slots for transmission of data is made in a way that minimizes the amount of resources required to accomplish a desired throughput.

Many applications require not only a given throughput, but also a specific quality of service, which may encompass behavior such as error performance or delay (or latency) of delivery, or variation in delay (jitter). Quality of service requirements may also impact the resources required by an application that uses the network. Thus in another example of the present invention, the selection of a portion of the available frequencies and time slots for transmission of data is made in a way that minimizes the amount of resources required to accomplish a desired quality of service.

In one illustrative example of the present invention, when a source node wishes to establish a circuit connection with a destination node, it begins by determining a channel quality profile, which is an assessment of quality of the medium connecting the two nodes at each frequency in the available bandwidth. Based on the channel quality profile, a portion of the available frequencies and time slots is selected for transmission.

The channel quality profile typically consists of a number of different quality-related metrics for each frequency and time slot available for use by the network. In one example of the current invention, the channel quality profile may be determined by one of either determining the attenuation of the channel at each available frequency, determining the noise at each available frequency, determining the interference at each available frequency, determining the signal to noise ratio at each available frequency, determining the variation of the attenuation of the channel with time at each available frequency, determining the variation of the attenuation of the channel with frequency at each available frequency, determining the variation in the phase response of the channel with time at each available frequency, and determining the variation of the phase response of the channel with frequency at each available frequency. Depending on the nature of the medium, any or all of these characteristics of the channel can have a significant impact on ability of the channel to support a given throughput and quality of service.

In one example of the present invention, the channel quality profile of a medium is determined by transmitting a sounding signal from a source node to a destination node and then determining the quality of the sounding signal arriving at the destination node at each frequency and time slot. Typically the sounding signal is a signal that includes energy at all the frequencies to be evaluated in creating the channel quality profile, and the detailed structure of the signal transmitted by the source node (the ideal sounding signal) is known to the destination node. The destination node may then compare the received sounding signal to the ideal sounding signal to determine the nature of any degradation introduced by the channel at each frequency and time slot.

In most communication systems, the throughput that can be supported in a given frequency band increases as the quality of the channel in that frequency band increases. It is typically desired to minimize the amount of resources required by a given application that transmits data on a network. Therefore, it is often desirable to select frequencies and time slots that have the best channel quality. In one example of the current invention, the selection process for selecting a portion of the available frequency and time slots is accomplished in three steps. In the first step, the throughput required to support the data rate requirement of the application is determined. In the second step, the channel quality profile is used to determine the most effective modulation type and density for each frequency. The modulation density is typically the number of bits/Hz/sec that a modulation provides, while the type of modulation is the specific signaling format used in the modulation. Finally, in the third step a set of frequencies, modulation types and densities is selected for each frequency wherein the total throughput provided by all the selected frequencies is sufficient to support the throughput requirements of the application.

In one example of the selection process just described, the throughput required to support the data rate requirement of the application is provided by a required data bandwidth indicator from the source node. The data bandwidth indicator, channel quality profile and resource allocation profile thus provide sufficient information for the destination node to select required resources autonomously.

The most effective modulation density that can be used at a given frequency is typically a function of the channel quality at that frequency and of the error performance that is required for the transmission. Data errors may be acceptable in some transmissions. In some situations, forward error correction can remove errors. In other cases, a retransmission protocol is used to ask the source node to retransmit data that contains errors. In other situations, the application can tolerate some errors. Thus in another example of the selection process just described, the most effective modulation type and density at each frequency is determined by ascertaining the densest modulation that can be supported at each frequency and time slot at a desired error performance based on the channel quality determined at that frequency.

In most network applications, it is desired to support the throughput and quality of service needs of an application in a way that minimizes the use of network resources. This approach maximizes the aggregate throughput that a network can provide. Thus in one example of the selection process just described, the choice of frequencies and modulation types and densities is made in a way that provides the throughput needed by the application with the minimum resource requirements. It should be apparent to those skilled in the art that suboptimal selection methods that produce reasonably efficient, but not minimal, usage of resources based on a channel quality profile and required throughput could also be used.

When the frequencies and time slots to be used for transmission from a source node to a destination node have been selected, according to the teachings of the present invention the selection must be communicated to other nodes attached to the medium. According to one example method, information about the selected frequencies and time slots is transmitted to a first node. This first node may then retransmit the information about the selected frequencies and time slots to other nodes attached to the medium.

Many practical communication channels are time varying. This means that a channel quality profile determined at a given point in time may eventually fail to reflect the quality of the channel as it current exists. If the channel quality improves at a given frequency, that frequency may become capable of supporting denser modulations. If the channel quality worsens at a given frequency, that frequency may become unable to provide the desired error performance at the modulation density that has been selected for it. In addition, the resource allocation profile may change, and frequencies and time slots may become available that can provide more effective use of network resources than those currently in use. Efficient use of the network resources requires that these changes be taken into account. Thus in the method of the present invention, the channel quality and resource allocation profiles are re-determined from time to time, and the suitability of existing frequency and time slot allocations is evaluated in light of any changes in these profiles. If the efficiency of resource allocation may be improved by more than a pre-determined amount, then a new portion of the available frequencies and time slots is selected for transmitting information to the destination node, and this selection is communicated to other nodes attached to the medium.

The present invention also comprises an apparatus that embodies the methods described herein. One such apparatus may be a network node. Such a network node may then be attached to a networking medium enabling conveyance of information across the network using circuit connections.

In one example embodiment of a network node, the network node is comprised of a resource allocation profile unit capable of determining existing frequency and time slot allocations on a medium, a reservation manager capable of selecting a portion of the available frequencies and time slots according to information contained in the resource allocation profile unit, and a medium access control unit capable of conveying an indicator of the selected frequency and time slots to the medium.

The resource allocation profile unit may comprises a profile module, an allocation processor and an allocation profile memory. The profile module contains one or more of the following modules: a profile receiver capable of receiving a frequency and time slot allocation profile from the medium, a reservation message receiver capable of receiving an individual frequency and time slot reservation message from the medium, a pseudo-composite frequency and time slot receiver capable of receiving a pseudo-composite frequency and time slot allocation profile from the medium, and an observation module capable of generating a reservation indicator by observing activity on the medium. The allocation processor stores an allocation profile in an allocation profile memory according to an indicator received from the profile module.

In one example of the present invention shown in FIG. 22, the reservation management unit of the network node may comprise a minimization unit 430 that minimizes the amount of resources selected to accomplish a desired throughput. In another example of the invention, the reservation management unit may comprise a minimization unit 430 that minimizes the amount of resources selected to accomplish a desired quality of service.

The reservation management unit is responsible for determining what resources should be selected for use. In one example of the present invention shown in FIG. 22, the reservation management unit comprises a channel quality unit 440 capable of determining the quality of a medium between a source node and a destination node, and a resource selector 420 capable of selecting resources from a list of available resources provided by the resource allocation profile unit according to a channel quality indicator provided by the channel quality unit 440.

In the foregoing example of the present invention, the channel quality unit 440 may comprise one or more of the following sub-units: an attenuation unit capable of determining the attenuation of the medium at each available frequency, a noise unit capable of determining the noise present on the medium at each available frequency, an interference unit capable of determining the interference present on the medium at each available frequency, a signal-to-noise unit capable of determining the signal-to-noise ration on the medium at each available frequency, an attenuation versus time variance unit capable of determining the variation of attenuation over time of the medium for each available frequency, an attenuation versus frequency variance unit capable of determining the variation of attenuation over frequency of the medium for each available frequency, a phase versus time variance unit capable of determining the variation of phase response over time of the medium for each available frequency and a phase versus frequency variance unit capable of determining the variation of phase response over frequency of the medium for each available frequency.

In another example, the channel quality unit may comprise a sounding unit capable of sending a sounding message from a source node to a destination node and receiving an indicator of sounding message quality from the destination node.

The reservation management unit typically may comprise sub-units that make decisions on resources to reserve. In one example of the present invention shown in FIG. 22, the reservation management unit comprises a throughput determination unit 400 capable of determining the throughput required by an application that will transfer data on the network, a modulation density evaluator 410 capable of determining the most effective modulation type and density at each frequency according to the channel quality profile, and a resource selector 420 capable of selecting resources according to the most effective modulation type and density and the required throughput.

In an example embodiment of the invention the throughput determination unit is capable of receiving a required data bandwidth indicator transmitted by a source node.

In another example embodiment, the modulation density evaluator 410 is capable of accepting a desired error performance and channel quality profile, and based on these determines the densest modulation that can be supported at each frequency and time slot.

In another example embodiment, the resource selector 420 is capable of selecting a set of frequencies and time slots that provide the throughput required by the application with the minimum resource requirements.

When a selection of frequency and time slots has been made, the selection must be communicated to other network nodes. The messaging to do this is typically prepared by the medium access control unit, which conveys the message a physical layer transmitter for transmission to a destination node. In one example of the present invention, the medium access control unit is capable of conveying a broadcast message containing information describing the selected channel resources.

In some situations, it may be desirable that a first node other than the source or destination node should transmit the information about the selected frequencies and time slots. In an example of the present invention, the medium access control unit is capable of conveying information about the selected frequencies and time slots to a first node, wherein the medium access control unit is capable of re-transmitting the information about the selected frequencies and time slots to other nodes on the medium.

In some embodiments of the present invention, the medium analysis unit may recognize impairment identification messages that describe impairments that may have arrived at the destination node in conjunction with a sounding message. In these embodiments of an NCU, the medium analysis unit may set carriers imposed upon by narrow-band impairments as unusable by degrading their corresponding modulation density. In response to wide-band interferers, the medium analysis unit may cause the circuit connection establishment unit to resound the medium and may upgrade the established modulation density for certain carriers if the interferer subsequently desists.

The circuit connection establishment unit may select a plurality of carrier frequencies for a new circuit connection from a set of carrier frequencies that are not currently assigned to an existing circuit connection. To ascertain this, the circuit connection establishment unit typically consults the resource allocation profile table maintained by the resource allocation tracking unit. The number of carrier frequencies that are selected by the circuit connection establishment unit may be dictated by an established modulation density for each individual carrier frequency. The number of carrier frequencies selected may also be driven by the amount of bandwidth a particular circuit connection requires. The established modulation densities are typically generated through the sounding process conducted by the circuit connection establishment unit. Once carriers are selected, the selection may be broadcast to other nodes attached to the networking medium by conveying the selections to the PHY/MAC.

According to another illustrative embodiment of the present invention, the NCU may further comprise a circuit connection evaluation unit. The circuit connection evaluation unit may cause the circuit connection establishment unit to periodically resound the networking medium. Based on a new transfer function profile, the circuit connection establishment unit may select a new set of networking resource for a particular circuit connection. The new selection may be applied to a particular circuit connection if the advantage in doing so exceeds a predetermined efficiency threshold. The threshold may be a programmable value that is directed to the circuit evaluation unit from a host device through the host data interface.

The NCU, according to one illustrative embodiment of the present invention, also comprises a modulation unit. The modulation unit may generate a set of modulated carrier signals. The carrier signals are typically modulated according to data that the modulation unit may receive from the host data interface and apportion among the carriers. In some embodiments of the present invention, the modulation unit receives a set of carrier frequencies from the circuit connection establishment unit and generates carrier signals at those frequencies. A modulated density established as a result of network medium profiling may dictate the modulation mode for each specific carrier.

The NCU may also be programmed through the host data Interface to operate as a destination node. In support of this capability, an NCU may further comprise a demodulation unit. The demodulation unit typically receives a set of modulated carriers from the PHY/MAC. According to one example embodiment of an NCU, the demodulation unit may receive a circuit connection identifier. The circuit connection identifier may be used as an index into the resource allocation profile table maintained by the resource allocation tracking unit. This provides a mechanism for the demodulation unit to identify the frequencies of specific carrier signals that are associated with a particular circuit connection. The type of modulation mode used at each carrier frequency to convey information may be ascertained by consulting the transfer function profile that describes the fidelity of the networking medium in terms of an established modulation density for each individual carrier frequency.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

Figure 1:
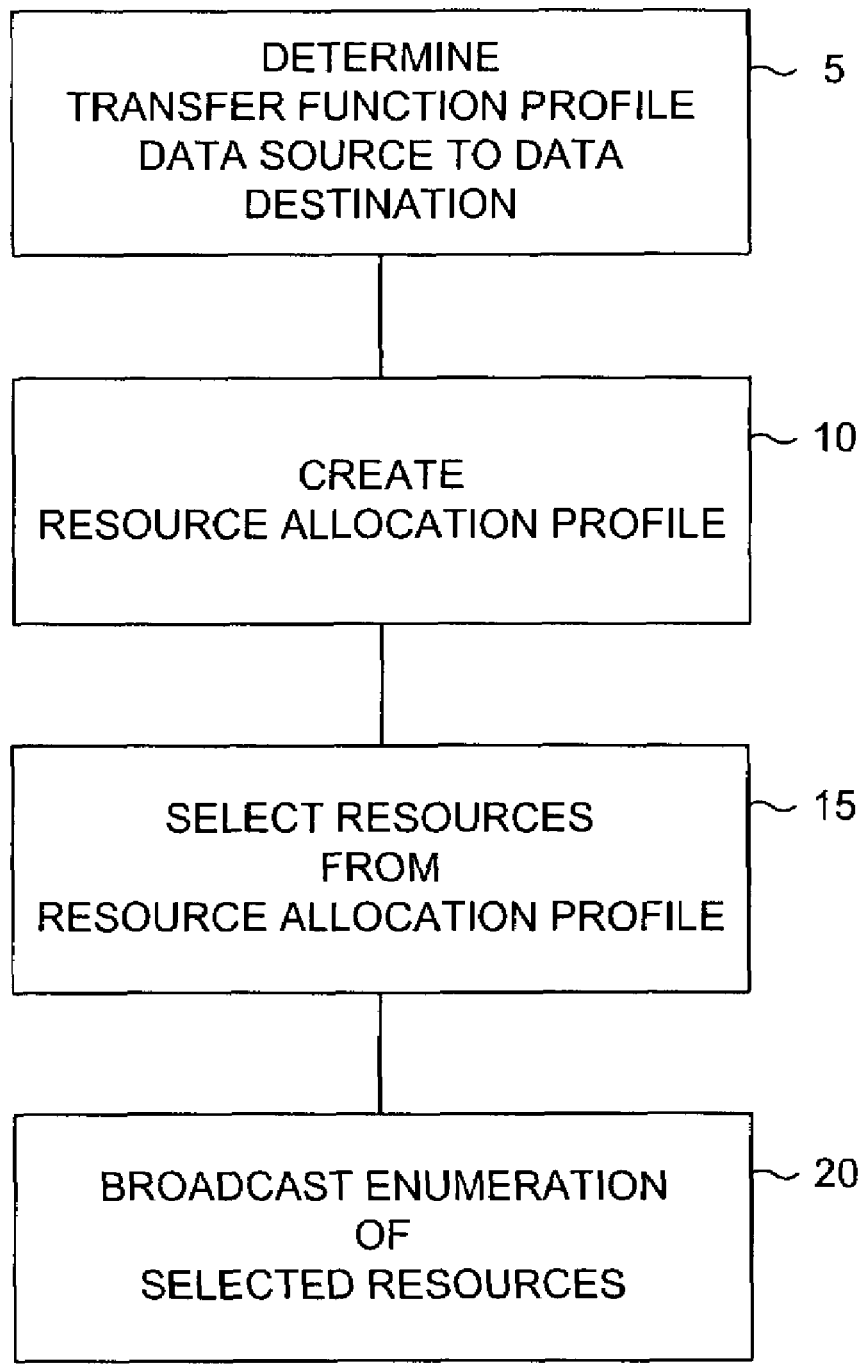
FIG. 1 is a flow diagram that depicts the steps necessary to establish a circuit connection over a LAN according to one illustrative embodiment of the present invention.

FIG. 1 is a flow diagram that depicts the steps necessary to establish a circuit connection over a LAN according to one illustrative embodiment of the present invention. Establishing a circuit connection over a LAN typically comprises the identification of a source node and a destination node that may be attached to a networking medium. In one example application of the present invention, the source node may be a cable television reception unit that receives video entertainment from some broadband source. The cable television reception unit may convey the video entertainment as an isochronous data stream onto the networking medium. The destination node in this example application may comprise a video display unit. The video display unit may receive the isochronous data stream through a circuit connection established over the LAN.

According to one illustrative method, the transfer function for the networking medium may first be determined (step 5). In this illustrative method, the transfer function may be determined from a source node to a destination node. The transfer function typically expresses the quality of the networking medium from the source node to the destination node. It should be noted that the transfer function profile is typically only valid for one direction. Where data needs to be conveyed from the "destination" node back to the "source" node, a new circuit connection will typically be established. In this situation, the destination node for a first circuit connection may be designated as the source node for a second circuit connection.

Establishing a circuit connection over a LAN according to this illustrative method generally relies on the reservation of networking resources for specific circuit connections. In support of this, the next step in this example method may comprise the creation of a resource allocation profile (step 10). The resource allocation profile typically represents the current assignment of networking resources to individual circuit connections.

In order to establish a circuit connection, some portion of the networking resources that have not been assigned to a particular circuit connection may be reserved for a new circuit connection (step 15). In order to ensure that other nodes attached to the network medium are aware of a new allocation of networking resources to a new circuit connection, the new networking resource allocations may be broadcast to other nodes attached to the medium (step 20).

Figure 2:
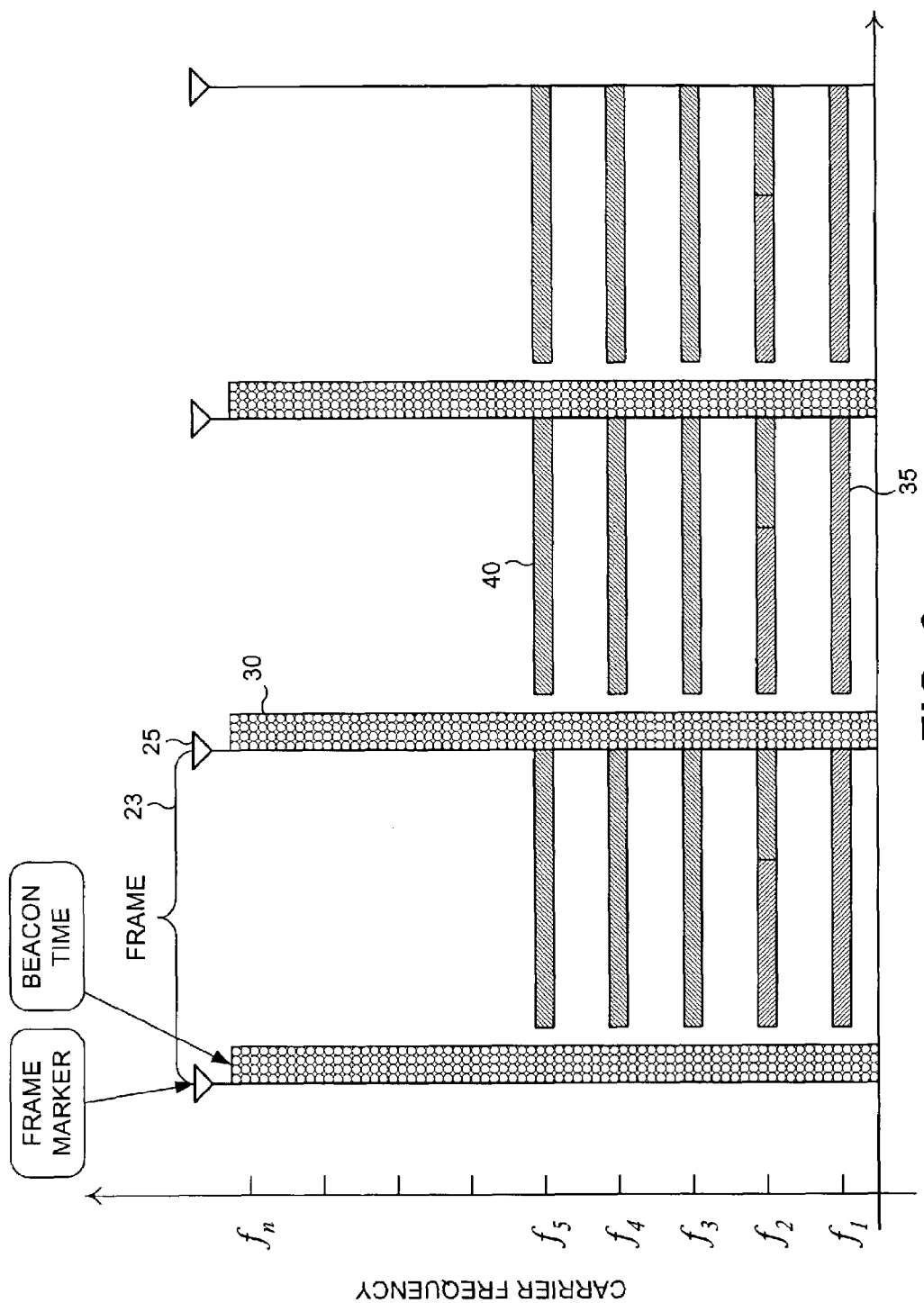
FIG. 2 is a pictorial representation that depicts the notion of a data frame interval according to one illustrative embodiment of present invention.

FIG. 2 is a pictorial representation that depicts the notion of a data frame interval according to one illustrative embodiment of the present invention. According to the illustrative method described here, networking resources may be temporally segregated into data frame intervals 23. According to one illustrative embodiment of the present invention, each node attached to the networking medium may maintain an internal frame marker 25. The internal frame marker maintained in each node is typically coincident with the beginning of the transmission of a beacon signal 30.

The beacon signal 30, according to this illustrative embodiment, comprises an enumeration of network resource allocations. According to one embodiment, nodes attached to the network medium contend for access to the medium and upon successful acquisition of the medium transmit a beacon signal 30. As other nodes attached to the medium receive the beacon signal 30, they may adjust the temporal position of their respective internal frame markers 25. As a plurality of nodes attached to a networking medium operate in accordance with the teachings of this invention, they may typically move toward synchronizing the temporal position of their internal frame markers 25.

According to one example embodiment of the present invention, the network medium may be capable of propagating a plurality of individual carriers. Each carrier is typically centered at a different frequency. Hence, in this type of embodiment, the total network resources may comprise a plurality of carriers; each of which may carry data when they are modulated. According to this embodiment, the data carrying capacity of each carrier may be further segregated into time-slots within a data frame interval 23.

Referring to the figure, a first circuit connection 35 may have allocated the entire data carrying capacity of a first carrier $f_1$ and a portion of a second carrier $f_2$. Likewise, a second circuit connection 40 may have an allocation of the remaining portion of the second carrier $f_2$ and the entire carrying capacity of three other carriers, $f_3$ through $f_5$. These example allocations are intended to illustrate the principle of assigning time-slots of available frequency spectrum in one embodiment of the present invention and are not to be construed as limiting the scope of the claims set forth infra.

Figure 3:
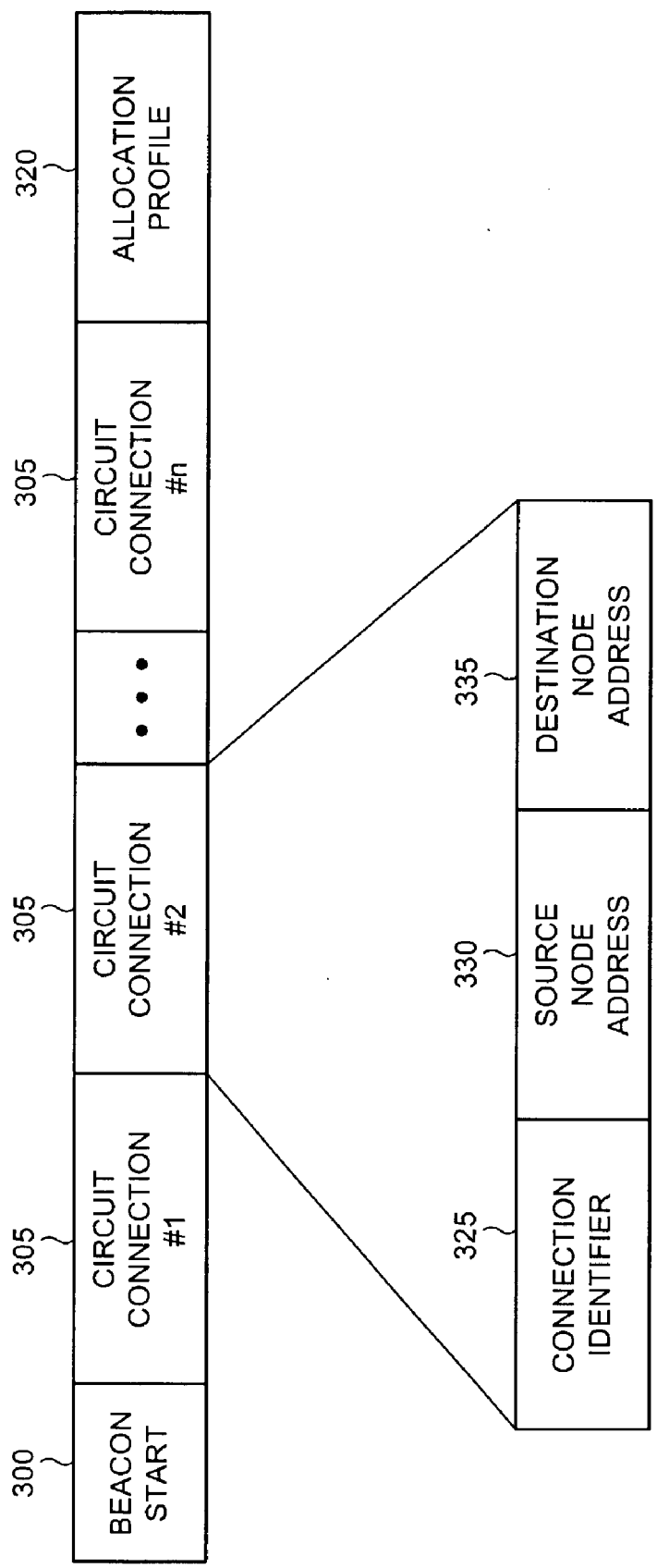
FIG. 3 is a pictorial illustration that depicts constituent components that may comprise a beacon signal according to one example embodiment of the present invention.

FIG. 3 is a pictorial illustration that depicts constituent components that may comprise a beacon signal according to one example embodiment of the present invention. In one example embodiment of the present invention, a beacon signal may comprise a start indicator 300. The beacon signal may further comprise one or more circuit connection descriptors 305. The number of circuit connection descriptors comprising a beacon signal may vary according to a particular embodiment of the invention. In the illustrative case described here, a total of "n" descriptors comprise the beacon signal. Each circuit connection descriptor may comprise a connection identifier 325, a source node address 330 and a destination node address 335. Immediately following the last circuit connection descriptor, the beacon signal may comprise an allocation profile 320.

Figure 4:
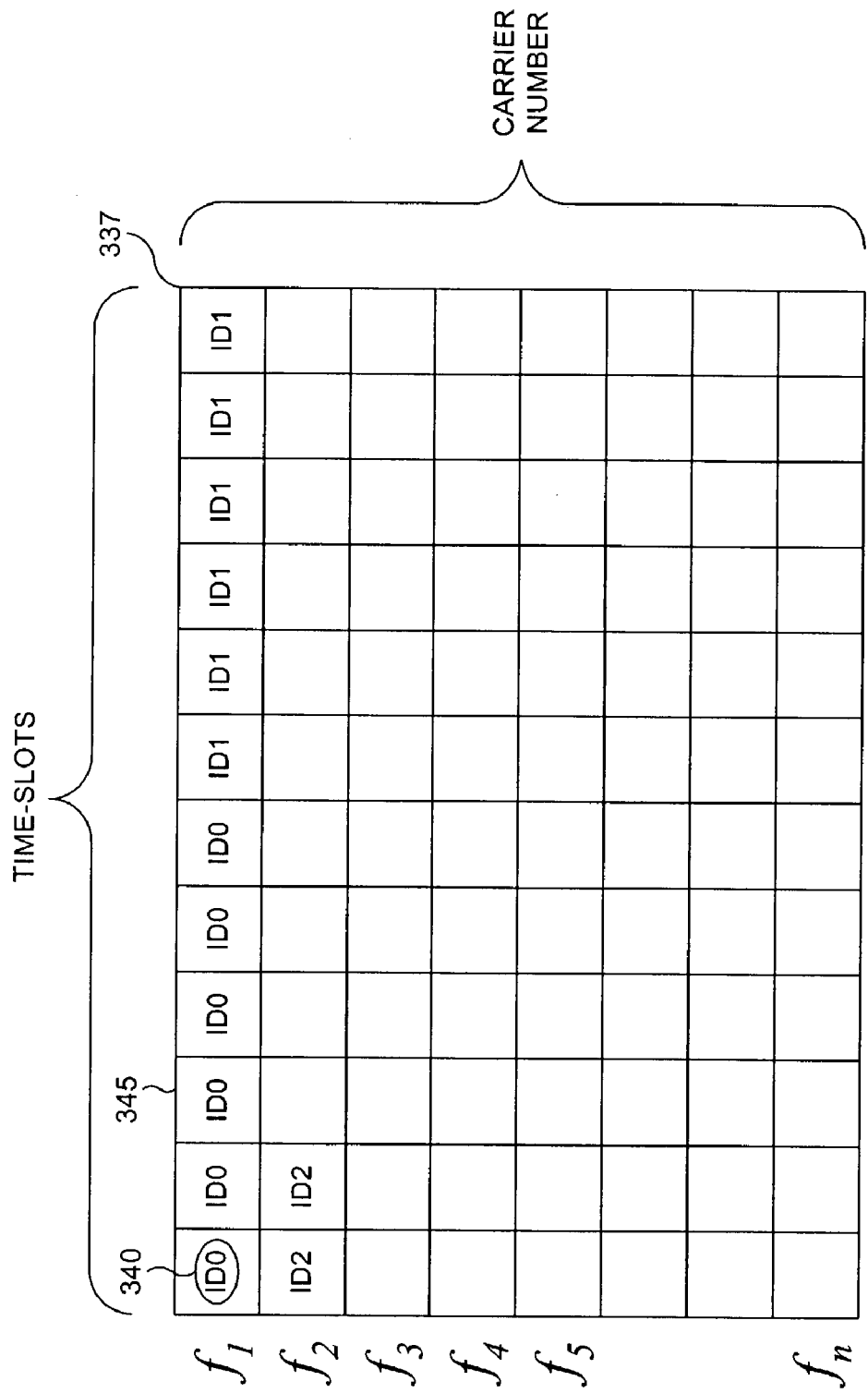
FIG. 4 is a pictorial representation of one example structure of an allocation profile comprising a beacon signal.

FIG. 4 is a pictorial representation of one example structure of an allocation profile table 337 comprising a beacon signal. For each carrier that can be conveyed by the networking medium, the allocation profile comprises a circuit connection identifier 340. In some embodiments of the present invention, a data frame interval 23 may be further divided into a plurality of time-slots 345. In these embodiments, each carrier may be apportioned among a plurality of circuit connections. Accordingly, the allocation profile in these embodiments may comprise a plurality of circuit connection identifiers for each carrier. Each circuit connection identifier affiliates a particular circuit connection with a particular carrier or carriers and may further define allocation of time-slots 345 within a data frame interval 23 for each of the associated carriers.

Figure 5:
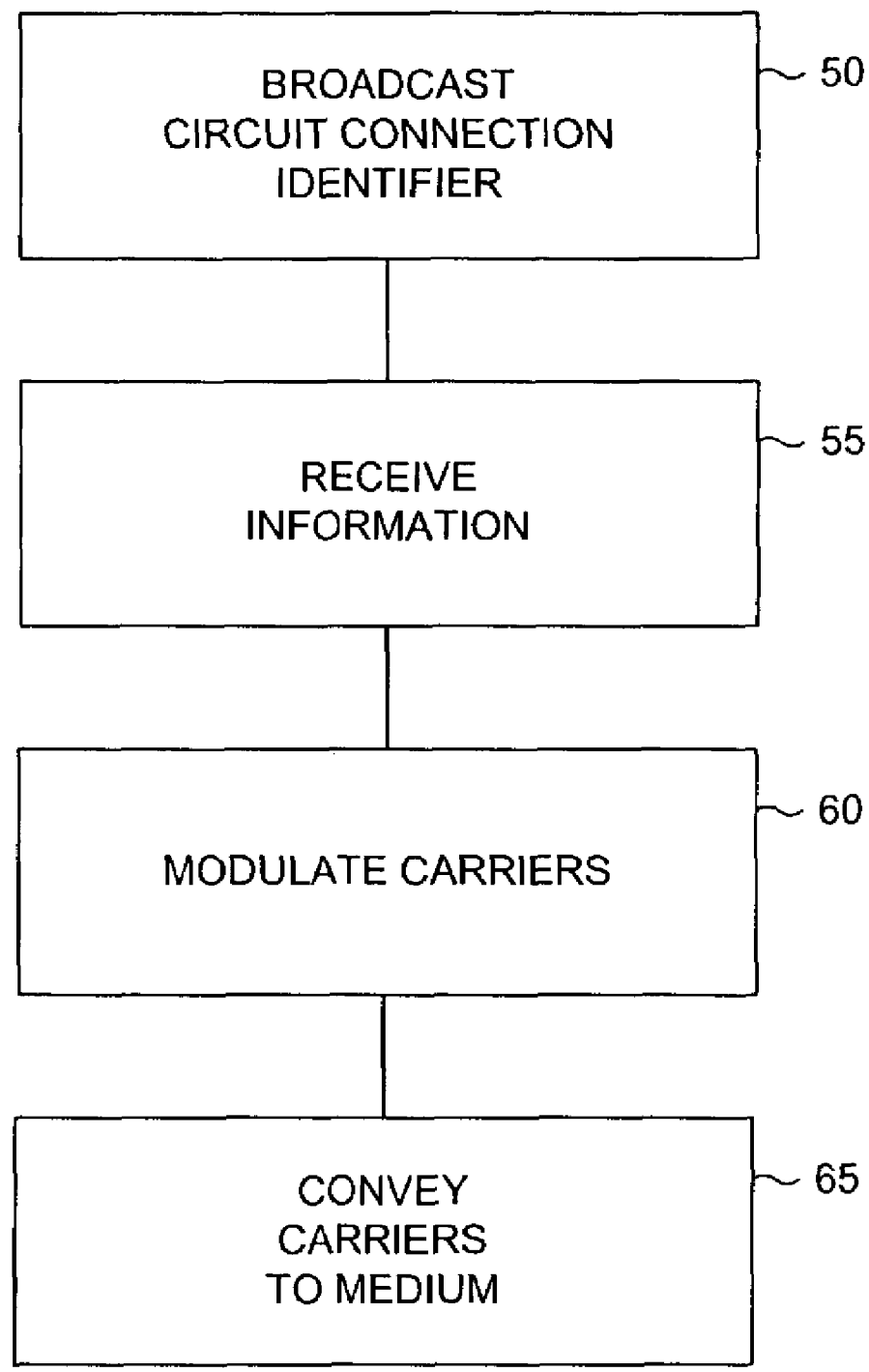
FIG. 5 is a flow diagram that depicts the steps necessary to transmit digital information over a circuit connection according to one illustrative embodiment of the present invention.

FIG. 5 is a flow diagram that depicts the steps necessary to transmit digital information over a circuit connection according to one illustrative embodiment of the present invention. Once a circuit connection has been established by reserving networking resources, a source node may broadcast a circuit connection identifier (step 50). The circuit connection identifier, according to one example method of the present invention, comprises a portion of the beacon signal 30. The circuit connection identifier may be used to determine the networking resources that have been allocated for a particular circuit connection.

This illustrative method continues with the step of receiving digital information (step 55) that needs to be conveyed from the source node to the destination node. In one example application of this invention, the digital information may comprise an entertainment content stream received from some data source, either external or integral to a node. This type of data stream may be commensurate with the transmission of television signals received in a cable television reception unit. It should be noted that this example application is presented here for the purposes of illustrating a typical use of a circuit connection in a networking environment. It is specifically noted that any application specific details presented herein are not to be construed as limiting the scope of the present invention.

However the digital information is received in the source node, whether it is received from an external connection or stored internal to the source node on some form of computer readable media, it may be used to modulate carriers that have been reserved for a particular circuit connection (step 60). The modulated carriers may then be conveyed to the networking medium (step 65) so that the information carried by the carriers may be propagated to the destination note.

Figure 6:
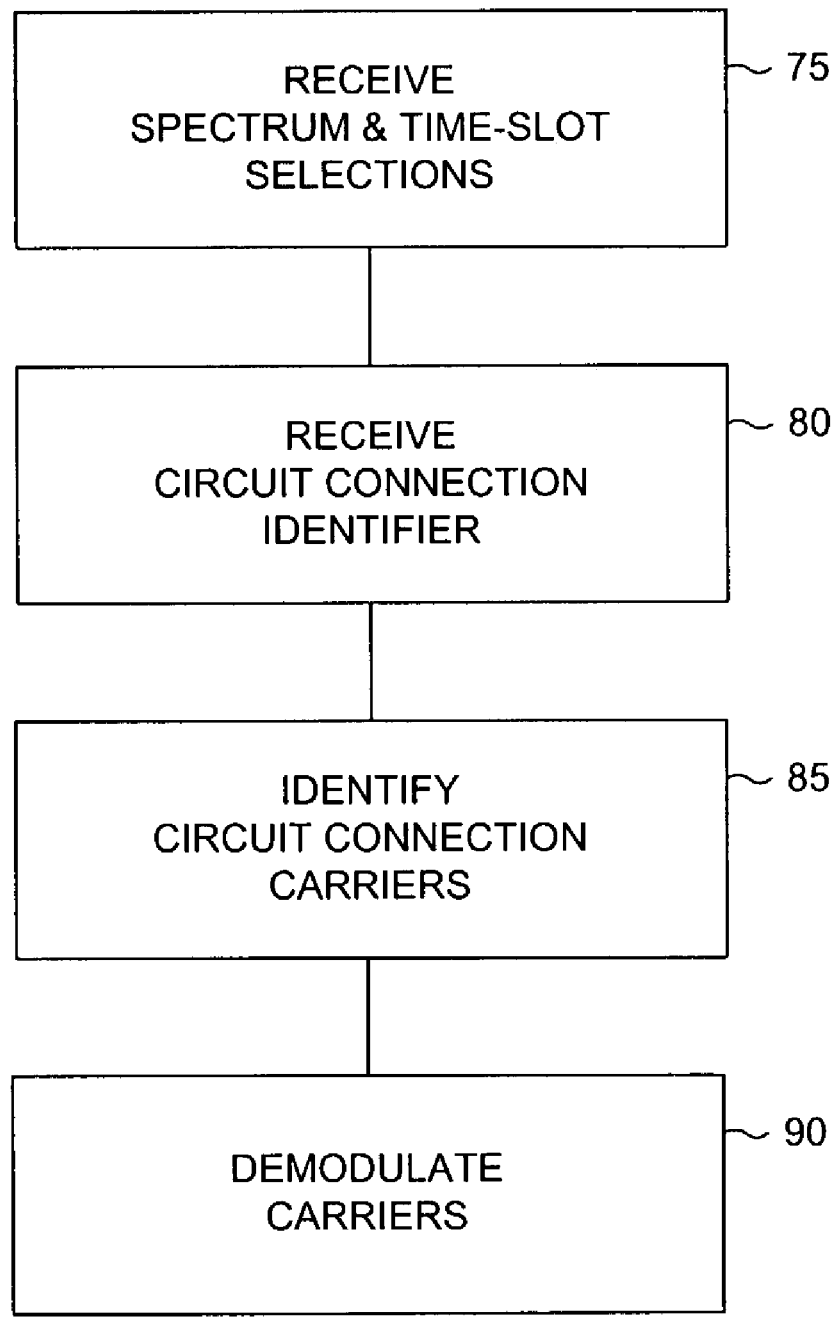
FIG. 6 is a flow diagram that depicts the process steps typically associated with receiving digital information through a circuit connection established over a LAN.

FIG. 6 is a flow diagram that depicts the process steps typically associated with receiving digital information through a circuit connection established over a LAN. According to one illustrative method, the destination node may receive spectrum and time-slot allocations from the networking medium (step 75). The destination node may further receive a circuit connection identifier (step 80). The circuit connection identifier may be used as an index into the spectrum and time-slot allocations. By using the circuit connection identifier as an index, the destination node may identify the specific carriers and the temporal (i.e. tome-slot) reservation of each carrier for a particular circuit connection (step 85). Once the destination node has identified the networking resources that carry a particular circuit connection, it may then demodulate those specific carriers in order to extract digital information they carry.

Figure 7:
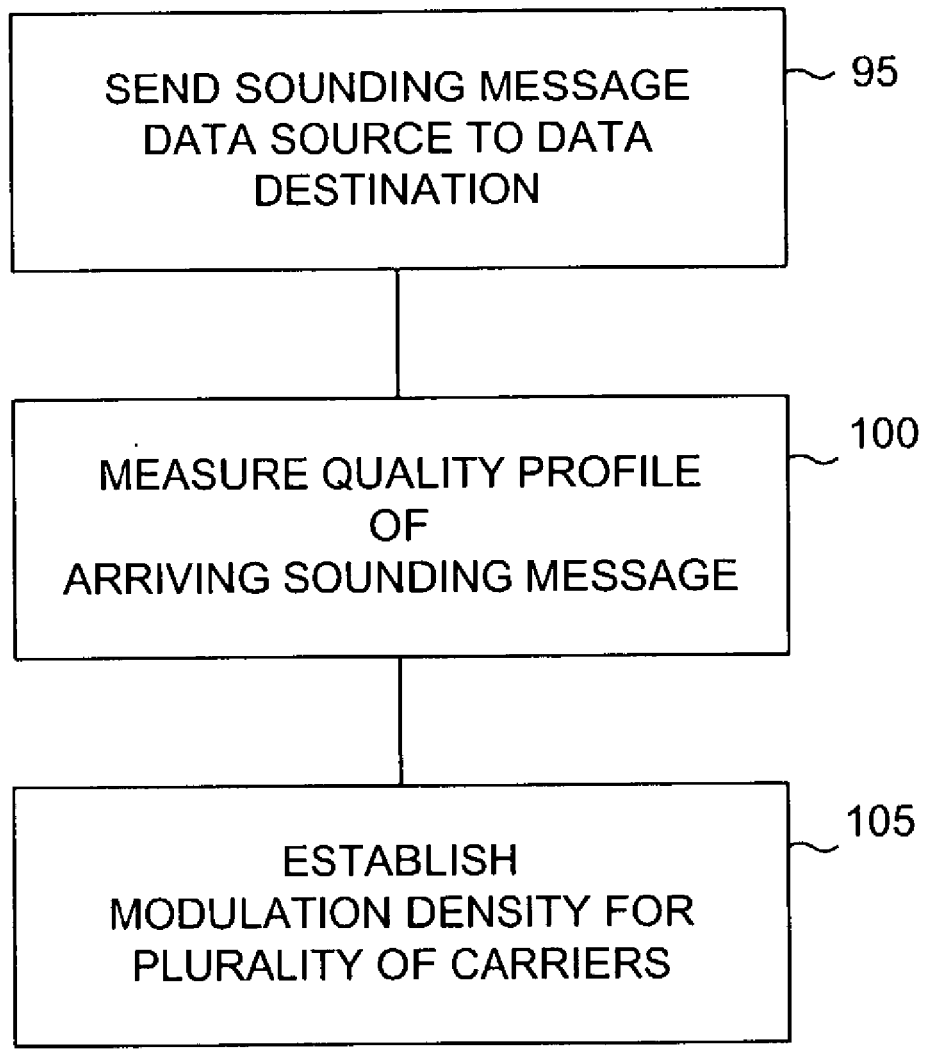
FIG. 7 is a flow diagram that depicts steps comprising a process to establish a transfer function profile between a data source node and a data destination node according to one illustrative method of the present invention.

FIG. 7 is a flow diagram that depicts steps comprising a process to establish a transfer function profile between a data source node and a data destination node according to one illustrative method of the present invention. In order to determine a transfer function profile, it is typically necessary to send a sounding message that originates in the data source node and is received in the data destination node (step 95). The sounding message that arrives at the data destination node is measured for quality (step 100). According to one illustrative method of the present invention, the quality of the sounding message arriving at the destination node may be used to establish a maximum modulation density for each carrier that may be propagated through the networking medium (step 105).

In one illustrative embodiment of a method according to the present invention, the sounding message may comprise a series of digital messages conveyed through the medium. Some of these digital messages may be conveyed using different carrier frequencies. According to one illustrative method, each carrier may be modulated by different portions of the sounding message using different modulation modes. These different modulation modes may comprise varying degrees of modulation density. The quality of the sounding message received in the destination node may be expressed in terms of an aggregate bit-error-rate for various modulation modes at each particular carrier frequency. This type of profiling may be used to determine the maximum modulation density that may be supported at each frequency comprising the total spectrum that may be supported by the networking medium. The maximum modulation density that may be supported at each frequency may be dictated by a maximum acceptable bit-error-rate for any communications carried by the networking structure.

Figure 8:
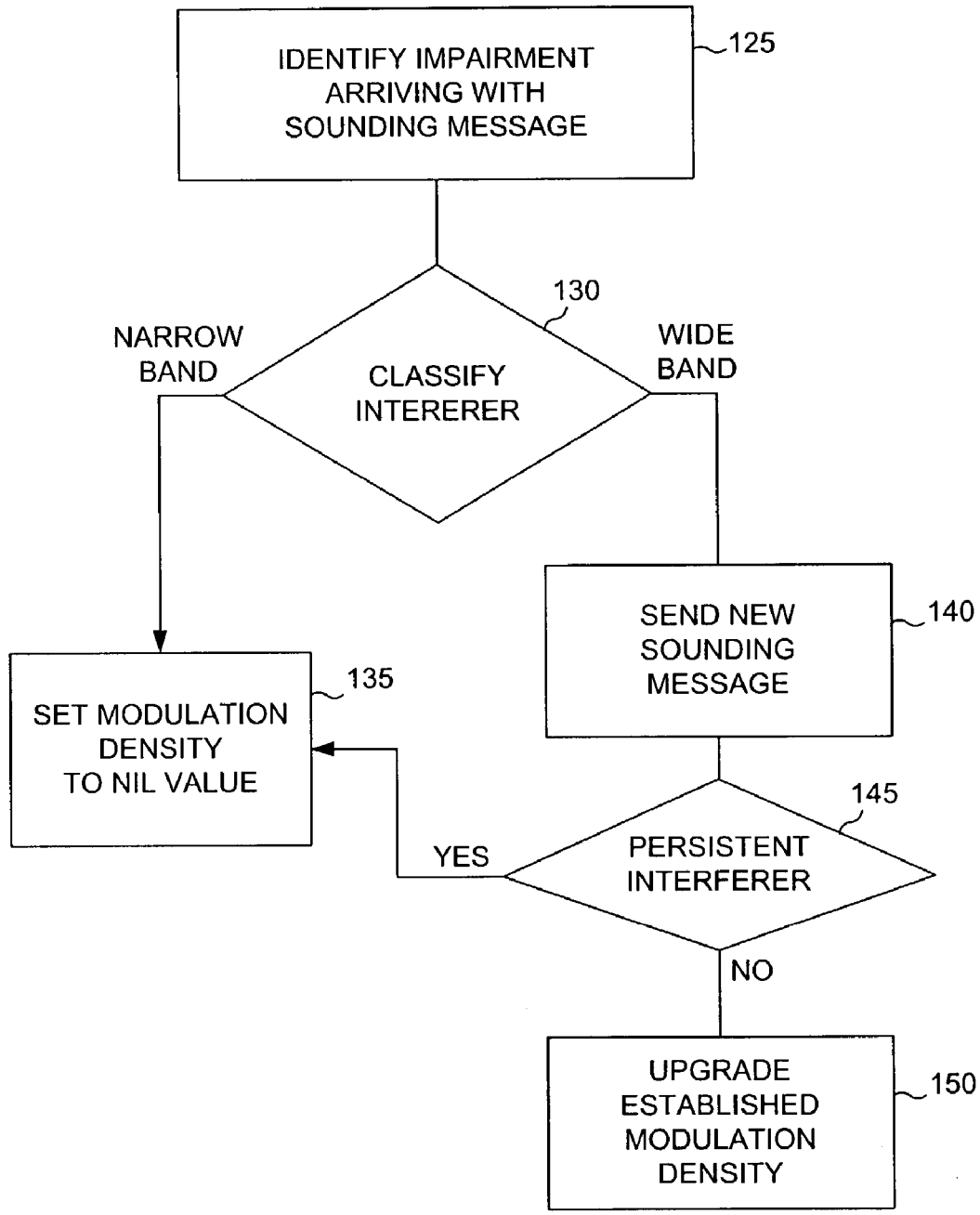
FIG. 8 is a flow diagram that depicts a process for identifying impairments that may be present in the networking medium according to one example method of the present invention.

FIG. 8 is a flow diagram that depicts a process for identifying impairments that may be present in the networking medium according to one example method of the present invention. In many networking structures, the communications medium may be susceptible to a wide variety of impairments. These impairments may affect the quality of the sounding messages that arrive at a destination node. Any degradation in the quality of the sounding messages may affect the transfer function profile from a data source node to a data destination node.

According to one illustrative method of the present invention, impairments arriving with any sounding message must first be identified (step 125). Once an impairment is identified, it may be classified as either a narrow-band interferer or a wide-band interferer (step 130). In the case of a narrow-band interferer, portions of the spectrum available for conveying information from the data source node to the data destination node may be entirely unusable. According to this illustrative method, the carriers that are imposed upon by a narrow-band interferer are rendered unusable by setting their established modulation density to a nil value (step 135).

Wide-band interferers may not necessarily preclude the use of a particular portion of any available spectrum used by a networking structure to convey information. In one illustrative embodiment of the present invention, a wide-band interferer may require re-sounding of the transmission medium between the source node and the destination node (step 140). If the wide-band interferer persists (step 145), one example method of the present invention requires that the carriers imposed upon by the wide-band interferer be utilized in accordance with an the modulation density established during the first sounding process (135). In some embodiments, the established modulation density for any particular carrier may be upgraded if the wide-band interferer is no longer present during the re-sounding process (steps 145 to 150). This presupposes the fact that a modulation density for those carriers may have been established at a less efficient level during the original medium profiling process.

In some embodiments of a method according to the present invention, the step of selecting resources that may be assigned to a new circuit connection may comprise receiving a required data bandwidth indicator from the data source node. In the example application described henceforth, a cable television reception unit may indicate the amount of bandwidth required to convey an entertainment content stream to a destination node; such as a video stream to a video display. Reserving the amount of bandwidth as indicated in the bandwidth indicator requires a review of the transfer function profile and the resource allocation profile. Since the transfer function profile dictates an established modulation density for all carriers that can be propagated by the networking medium, a selection of available carriers may be made in accordance with the amount of bandwidth each carrier may support using the established modulation density. Available carriers are those carriers that are indicated in the resource allocation profile as not being assigned to a circuit connection.

In some embodiments of a method according to the present invention, the transfer function profile between a source node and a destination node may be updated on a periodic basis. An updated transfer function profile, which results in new established modulation densities for each individual carrier, may require a new selection of networking resources in order to promote efficient utilization of the networking medium. In these types of embodiments, the method provides for the use of an "efficiency" threshold. Existing allocation of spectrum and time-slots to a particular circuit connection may be evaluated by comparing the amount of networking resources used under an existing allocation with the amount of networking resources that would be used if resource selections were to be made in light of the updated transfer function profile. New resource selections would be applied to existing circuit connections if resource savings exceed the efficiency threshold. New selections of spectrum and time-slots may then be broadcast to other nodes attached to the networking medium as they take affect.

Figure 9:
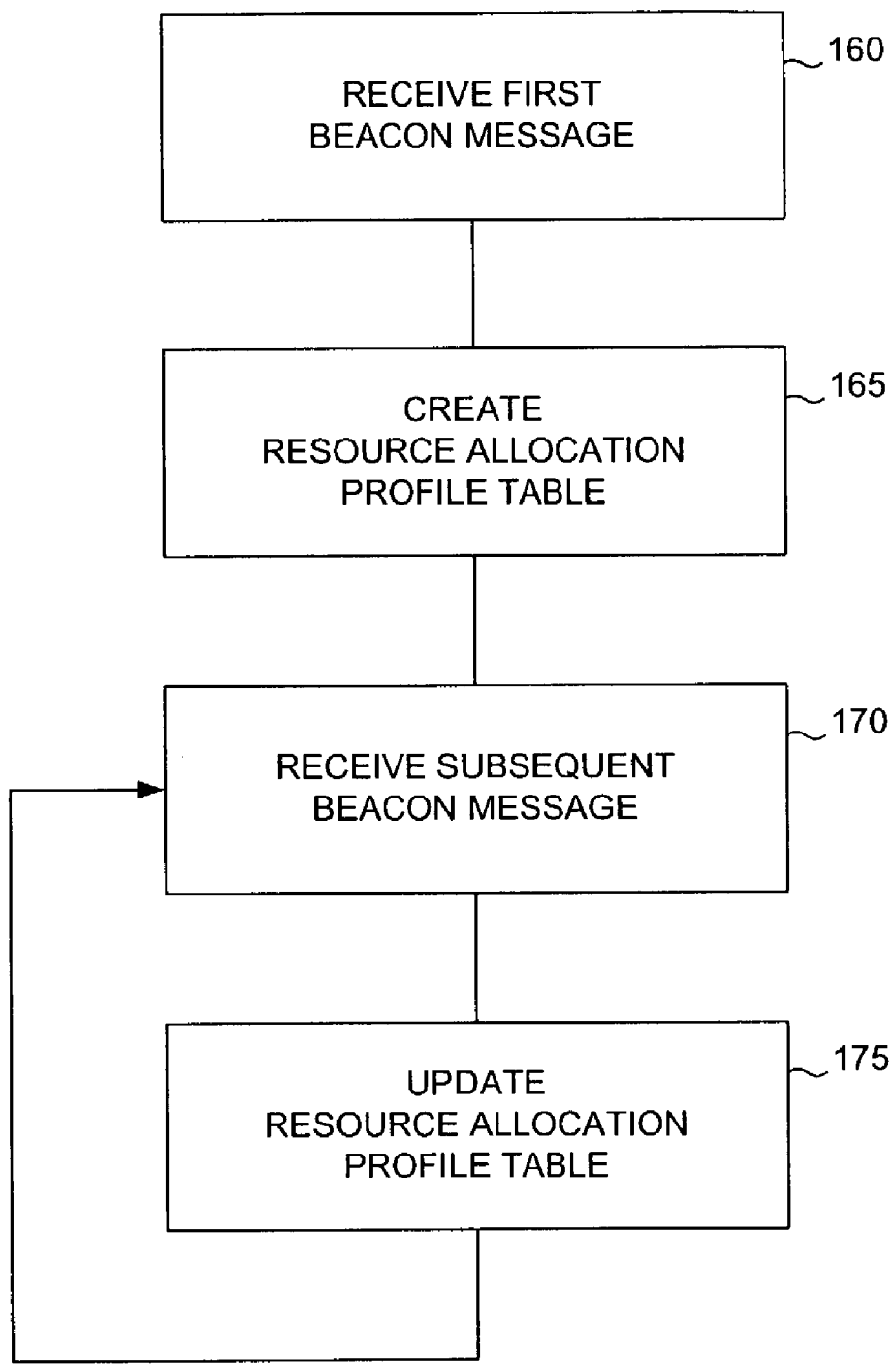
FIG. 9 is a flow diagram that depicts the process of creating a resource allocation profile according to one illustrative method of the present invention.

FIG. 9 is a flow diagram that depicts the process of creating a resource allocation profile according to one illustrative method of the present invention. In some embodiments of the present invention, each node attached to the networking medium creates a resource allocation profile by receiving a first beacon message from the networking medium (step 160). The contents of this first beacon message may be used to create a resource allocation profile table (step 165). The resource allocation profile table may comprise a plurality of entries that defined current allocation of networking resources to particular circuit connections. In one embodiment of this invention, circuit connections may be identified by a circuit connection identifier. The circuit connection identifier may then be used as an index into the resource allocation profile table so that specific portions of the spectrum available for propagating data and time-slots within that spectrum may be associated with particular circuit connections.

As a node continues to operate in a networking structure according to the present invention, it may receive subsequent beacon messages from the networking medium (step 170). These subsequent beacon messages may then be used to update to the resource allocation profile table (step 175). As subsequent beacon messages arrive, the updated resource allocation profile table represents the current allocation of networking resources to specific circuit connections as perceived by a particular node attached to the networking medium.

Figure 10:
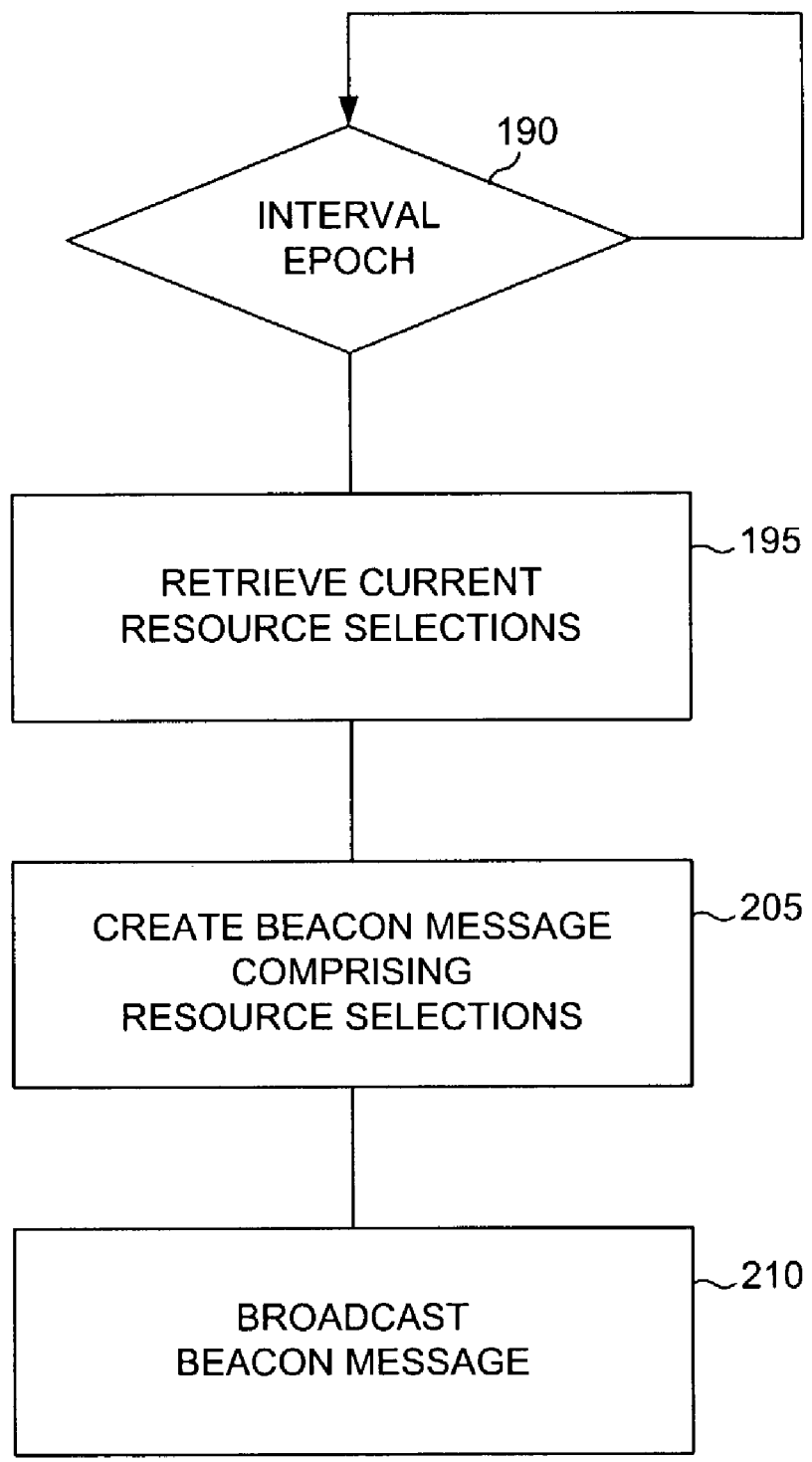
FIG. 10 is a flow diagram that depicts an illustrative process for broadcasting an enumeration of resource reservation when a new circuit connection is established according to the dictates of the present invention.

FIG. 10 is a flow diagram that depicts an illustrative process for broadcasting an enumeration of resource reservation when a new circuit connection is established according to the dictates of the present invention. Each node attached to the networking medium maintains an internal frame marker 25 as introduced above. In most embodiments of the present invention, the internal frame marker 25 is used to trigger the transmission of a beacon signal (step 190). In those cases where a new circuit connection has just been established by a node attached to the network, the most current resource allocations may be retrieved (step 195) and used to create a beacon signal (step 205). The beacon signal may then be conveyed to the networking medium in order to realize a broadcast to other nodes attached thereto (step 210).

The present invention may further comprise a networking control unit that embodies the method of the present invention. The networking control unit taught here may be incorporated into higher-level assemblies that may constitute data source or data destination nodes that may be attached to a network. The present invention may further comprise such higher-level assemblies comprising data source or data destination nodes.

Figure 11:
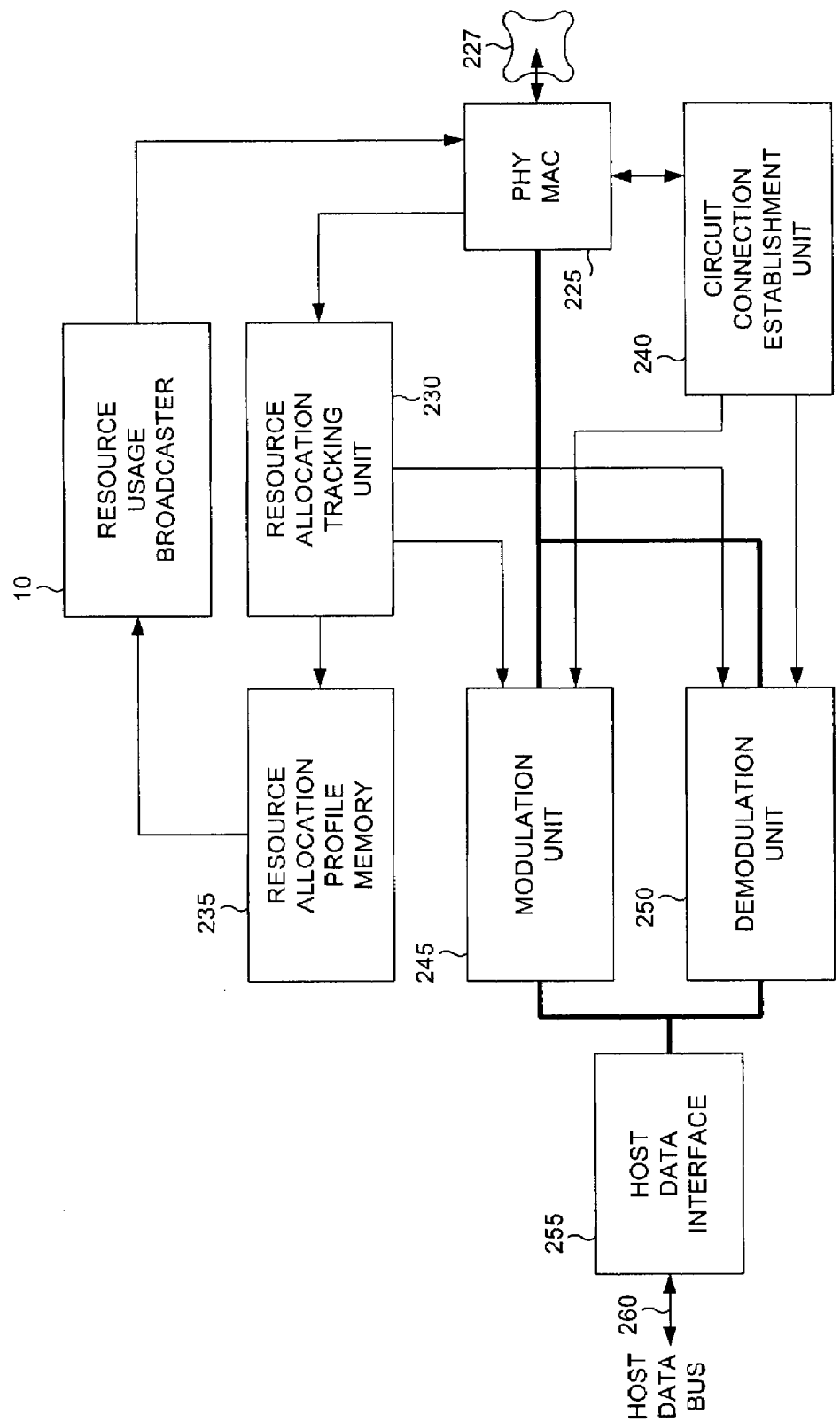
FIG. 11 is a block diagram that depicts the structure of one possible embodiment of a networking control unit that implements the methods of the present invention.

FIG. 11 is a block diagram that depicts the structure of one example embodiment of a networking control unit that implements the methods of the present invention. A networking control unit (NCU) typically comprises a PHY/MAC 225. The PHY/MAC 225 comprises the hardware elements necessary to attach a node to a networking medium 227. In some embodiments of the present invention, the PHY/MAC 225 may comprise a wireless interface. In yet other embodiments of the present invention, the PHY/MAC 225 may comprise a wired interface. According to one embodiment of the present invention, the PHY/MAC 225 may comprise a power or telephone line interface. The PHY/MAC 225 may comprise an OFDM media access mechanism with enhanced CSMA/CA protocol. Such enhancements may comprise support for priority classes, fair access and controlled latency.

In some embodiments of an NCU that operates in accordance with the teachings of the present invention, the PHY/MAC 225 may receive beacon signals from the networking medium 227. These beacon signals may be directed to a resource allocation tracking unit 230 that further comprises the NCU. The resource allocation tracking unit 230 maintains a resource allocation profile table. The resource allocation profile table may be stored in an allocation profile memory element 235.

When a first beacon signal is received by the resource allocation tracking unit 230, it creates an allocation profile table in the memory element 235. As subsequent beacon signals are received by the resource allocation tracking unit 230, the resource allocation profile stored in the memory element 235 may be updated to reflect the most current perception of network resource allocation.

The NCU may further comprise a host data interface 255. The host data interface 255 allows the NCU to be connected to a host data bus 260. In operation, a host device may communicate with the NCU through the host data interface 255. Using the host data interface 255, a host device may provide a destination address to the NCU. The host device may then request the NCU to establish a circuit connection targeting the destination address.

The NCU may further comprise a circuit connection establishment unit 240. The circuit connection establishment unit 240 typically determines a transfer function for the networking medium from the node comprising the NCU to a destination node that responds to the destination address received by the NCU over the host data interface 255. In most embodiments of the present invention, the NCU may also accept its own physical address, i.e. a source address, over the host data interface 255.

According to one illustrative embodiment of an NCU, the circuit connection establishment unit 240 may further comprise a sounding unit and may command the sounding unit to transmit a sounding message to a remote node attached to the networking medium and is responsive to the destination address. In most embodiments of a system according to the present invention, a corresponding NCU comprising the remote node will receive the sounding message and perform quality measurements according to the teachings of the methods of the present invention in order to determine the fidelity of the networking medium. The remote NCU responds to the sounding message by sending quality profile information back to the initiating NCU. In one embodiment of an NCU, these messages may be received by a medium analysis unit that may further comprise the circuit connection establishment unit.

Using the quality profile information, the medium analysis unit may select specific modulation modes for each carrier that can be propagated by the networking medium. Selection of specific modulation modes may be accomplished by comparing the quality profile information against a maximum error threshold. In most embodiments of the present invention, the quality profile is expressed in terms of a bit-error-rate for different types of modulation modes used to convey the sounding message to the destination node. The resultant profile defines the acceptable modulation density for each carrier that may be used to convey data to the destination node.

In those instances where the medium analysis unit discovers the presence of an interferer, it typically categorizes the interferer as either a wide-band interferer or a narrow-band interferer. The medium analysis unit may mark those carriers imposed upon by a narrow-band interferer as being unusable by setting to nil the established modulation density for those carriers. When a wide-band interferer is recognized, the medium analysis unit typically commands the sounding unit to transmit another sounding message. If the wide-band interferer is no longer present, the modulation density for those carriers imposed upon by the wide-band interferer may be upgraded.

In furtherance of establishing a circuit connection, the circuit connection establishment unit 240 may consult the resource allocation profile stored in the allocation profile memory element 235 to determine the next circuit connection identifier that may be used to identify a new circuit connection. The circuit connection establishment unit 240 may receive a bandwidth indicator from a host device through the host data interface 255. Based on the amount of bandwidth specified in the bandwidth indicator, the circuit connection establishment unit 240 may select a plurality of carriers from those carriers identified in the resource allocation profile table as being available. The number of carriers selected may be determined by the data carrying capacity of the individually selected carriers as defined by an established modulation density and wherein the aggregate data carrying capacity of the selected carriers supports the bandwidth requirement.

In yet another illustrative embodiment of the present invention, the NCU may further comprise a connection evaluation unit. The connection evaluation unit may cause the circuit connection establishment unit to resound the networking medium between the source node and the destination node on a periodic basis. The connection evaluation unit may also cause the circuit connection establishment unit to make a new selection of network resource selections. The new selection of network resource is typically not applied to a particular connection unless there is an advantage to be gained by applying the new selections. If the advantage that might be achieved by supplanting a circuit connection's existing resource allocations with the new selections does not meet a predefined efficiency threshold, the new network resource selections may be discarded and the original selections may be retained. This prevents a thrashing effect that may otherwise occur if the network resources of particular circuit connections were to be routinely reconfigured during this evaluation activity. The circuit connection evaluation unit may receive the predefined efficiency threshold from a host device by means of the host data interface.

Once a circuit connection identifier has been associated with a set of carriers, this association is stored in the resource allocation profile table stored in the allocation profile memory element 235. In one embodiment of the present invention, the NCU may broadcast the new selections to other nodes attached to the networking medium. In some embodiments, the new selections are first amalgamated with any existing allocation profile stored in the resource allocation profile table. These may then be conveyed to the networking medium as a beacon signal.

In one embodiment of an NCU according to the present invention, the host data interface 255 comprises a direct memory access (DMA) capability. This DMA capability allows the host data interface 255 to retrieve information directly from the host data bus 260 and direct the information to a modulation unit 245 that further comprises the NCU. The modulation unit 245 obtains an enumeration of carriers that are to be used for a particular circuit connection together with established modulation densities for each carrier from the circuit connection establishment unit 240. Using this information, the modulation unit 245 apportions the incoming data from the host data interface 255 among a plurality of carriers that it may modulate according to the established modulation density for each carrier. Each carrier may be used in its entirety with respect to a particular data frame interval or it may only be used for a particular selection of time-slots within a data frame interval. This time-slot allocation may also be stored in the resource allocation profile table. The modulated carriers may then be conveyed to the PHY/MAC 225. The PHY/MAC 225 propagates these carriers onto the physical medium comprising the network.

When an NCU is programmed through the host data interface 255 to serve as a destination node, the PHY/MAC 225 receives modulated carriers from the networking medium 227. These modulated carriers may be directed to a demodulation unit 250 that may further comprise the NCU. The demodulation unit 250 receives circuit connection details from the circuit connection establishment unit 240. These details comprise information relating to what frequencies the carriers are centered at, the modulation density (i.e. mode) used to modulate the carrier and the time-slot allocation of each carrier to a circuit connection.

The demodulation unit 250 recovers digital information from the set of arriving modulated carriers. The digital information may then be conveyed to the host data interface 255. Analogous to the method of transmitting information outward from the NCU to the networking medium, the host data interface 255 may apply DMA techniques to transfer incoming digital information from the demodulation unit 250 to the host data bus 260.

Figure 12:
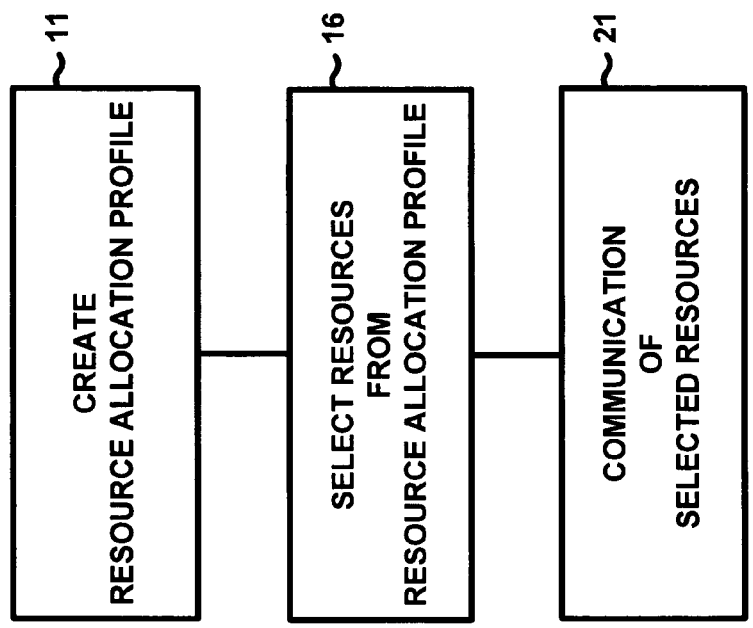
FIGS. 12-23 are various diagrams that depict alternative embodiments of the invention.

FIG. 12 is a flow diagram that depicts the steps necessary to establish a circuit connection over a LAN according to one illustrative embodiment of the present invention. Establishing a circuit connection over a LAN typically comprises the identification of a source node and a destination node that may be attached to a networking medium. In one example application of the present invention, the source node may be a cable television reception unit that receives video entertainment from some broadband source. The cable television reception unit may convey the video entertainment as an isochronous data stream onto the networking medium, which may be standard AC power wiring, telephone wiring, structured wiring such as Cat-5 wiring, or a wireless link. The destination node in this example application may comprise a video display unit. The video display unit may receive the isochronous data stream through a circuit connection established over the networking medium.

According to one illustrative method of FIG. 12, a resource allocation profile of existing frequency and time slot allocations in use on the medium is determined (step 11). The resource allocation profile indicates which frequencies and time slots are currently in use on the medium, and thus can be used to determine which frequencies and time slots are available for establishment of a new circuit connection. In step 16, a portion of the available frequencies and times slots are selected for use by a new circuit connection. Finally, in step 21 the selection of frequencies and time slots is communicated to other nodes attached to the medium, enabling them to update their resource allocation profiles.

Figure 13:
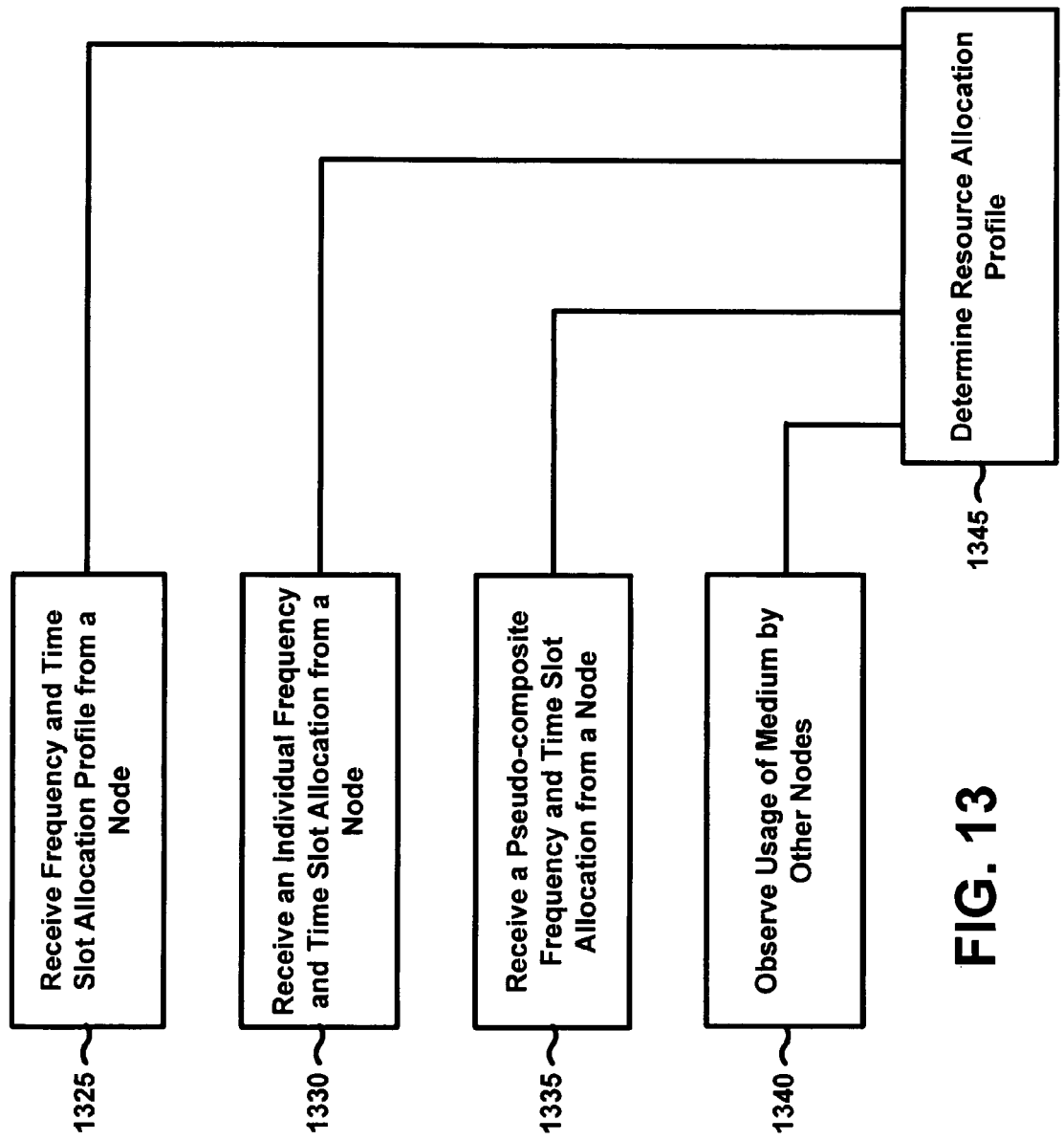

It will be apparent from FIG. 13 that there are many ways of determining a resource allocation profile (step 1345). In one embodiment of the present invention, the determination of the resource allocation profile may be made by receiving a frequency and time slot allocation profile from a node attached to the medium (step 1325). In a second embodiment of the present invention, the determination of the resource allocation profile may be made by receiving individual frequency and time slot reservation messages from a node attached to the medium (step 1330). In another embodiment of the present invention, the determination of the resource allocation profile may be made by receiving pseudo-composite frequency and time slot profile messages from a node attached to the medium (step 1335). In yet another embodiment of the present invention, the resource allocation profile may be determined by observation of the usage of the medium by other nodes attached thereto (step 1340).

In a typical embodiment of the present invention, the selection of frequencies and time slots will be made in a way that the amount of resources required to accomplish a desired throughput is reduced to a minimum as closely as feasible.

Similarly, in some applications a certain quality of service is required. Quality of service typically includes restrictions on the delay encountered by the data in transmission over the network, the variability in the delay, the error performance, and other quality related metrics. Quality of service requirements may result in a need for greater resources in order to achieve a given throughput. Thus in a typical embodiment of the present invention, the selection of frequencies and time slots will be made in a way that the amount of resources required to accomplish a desired quality of service is reduced to a minimum as closely as feasible.

Figure 14:
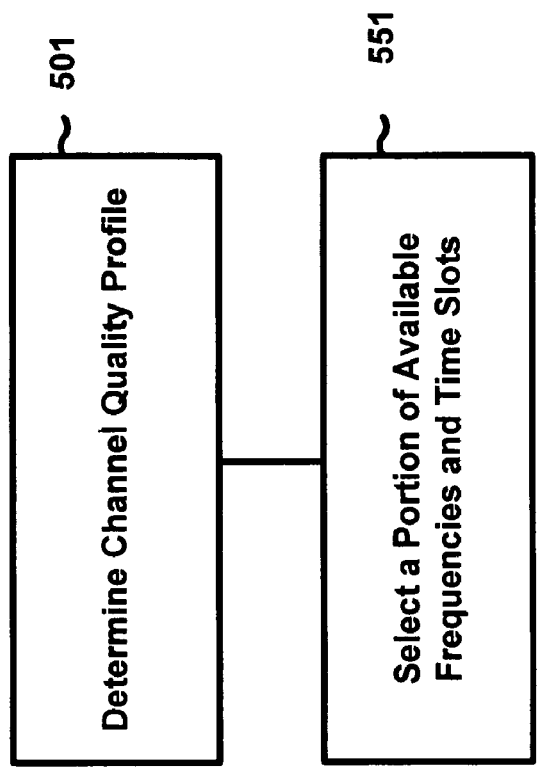

Because the channel quality can vary substantially according to the frequency and time slot chosen and also according to the physical location of a network device within the medium, in some embodiments of the present invention, such as shown in FIG. 14, the step of selecting a portion of the available frequencies and time slots may also comprise the steps of determining a channel quality profile of the medium (step 501) and then making the selection of a portion of the available frequencies and time slots based on the channel quality profile (step 551).

Figure 15:
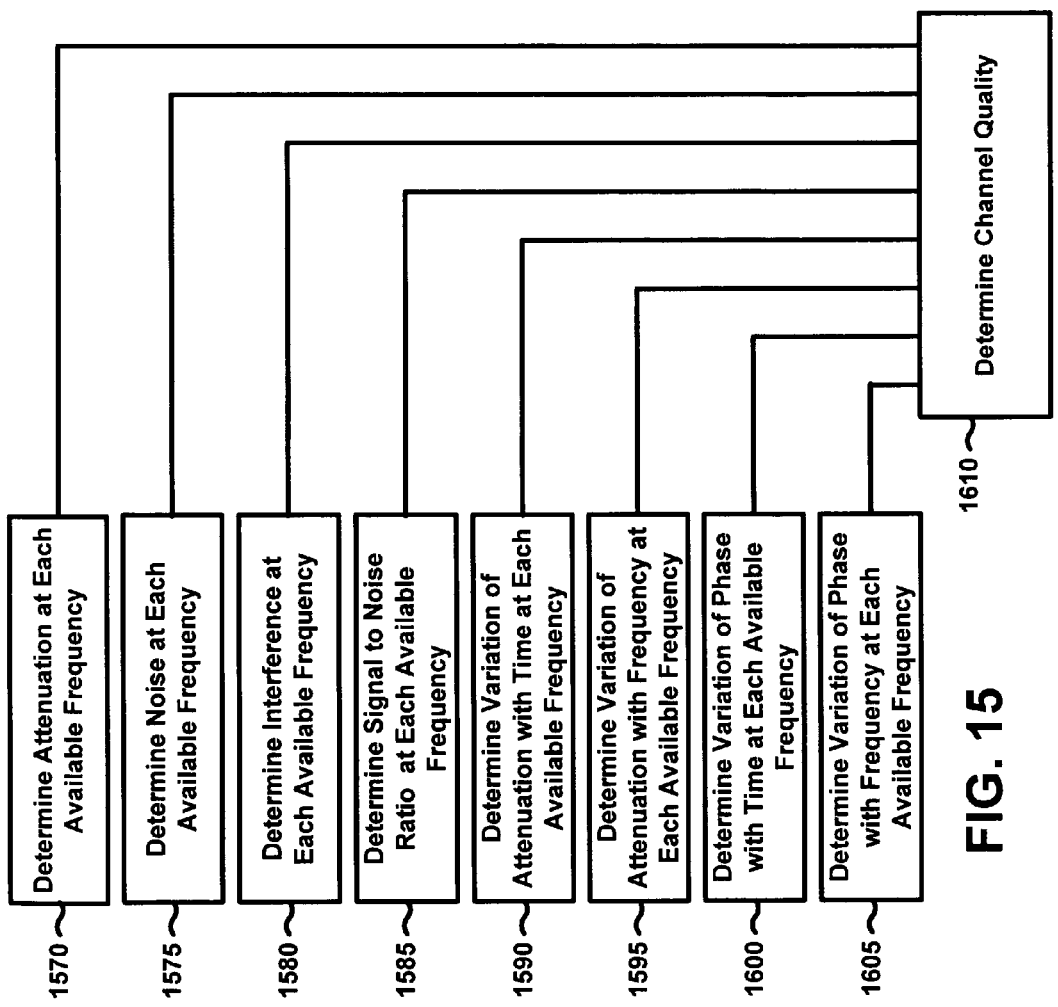

The channel quality profile is typically formed by determining information about a variety of performance characteristics of the channel at each frequency. According to one embodiment of the present invention as shown in FIG. 15, the channel quality profile 1610 may be determined from one of either of several characteristics, which include determination of the attenuation of the channel at each available frequency (step 1570), determination of the noise present at each available frequency (step 1575), determination of the interference present at each available frequency (step 1580), determination of the signal to noise ratio at each available frequency (step 1585), determination of the variation of the attenuation of the channel with time at each available frequency (step 1590), determination of the variation of the attenuation of the channel with frequency at each available frequency (step 1595), determination of the variation of the phase response of the channel with time at each available frequency (step 1600), and determination of the variation of the phase of the channel with frequency at each available frequency (step 1605).

Figure 16:
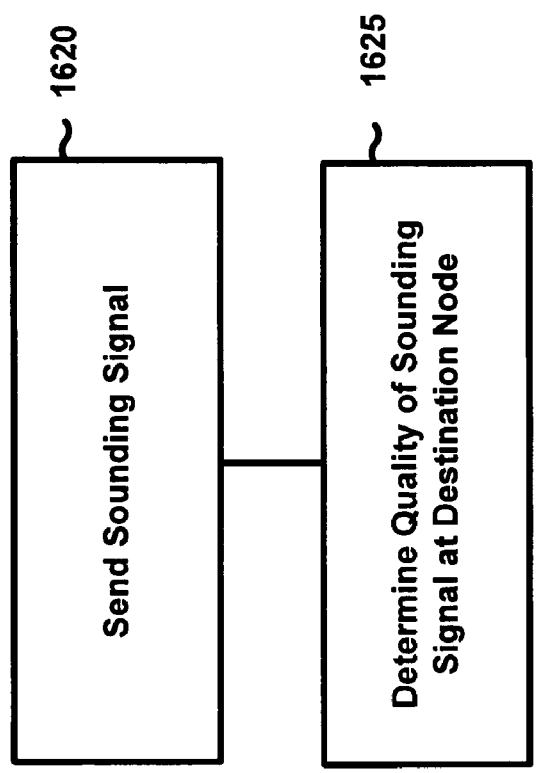

According to one illustrative method as shown in FIG. 16, the channel quality profile is determined by sending a sounding signal from a source node to a destination node (step 1620) and determining the quality of the sounding signal arriving at the destination node (step 1625).

Figure 17:
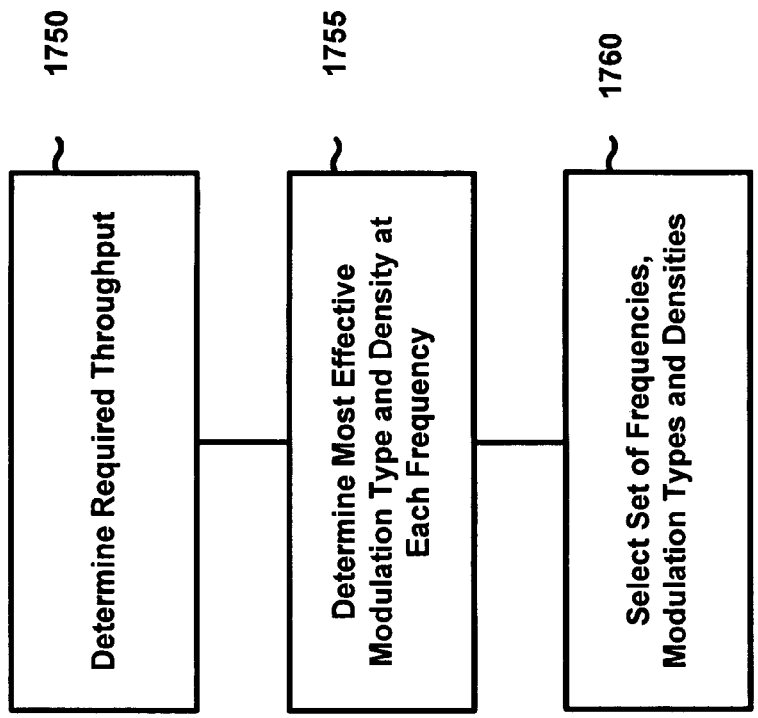

In another illustrative method of the present invention as shown in FIG. 17, the step of selecting a portion of the available frequencies and time slots comprises the following steps. First the throughput required to support the data rate requirement of an application that sources data may be determined (step 1750). Secondly, the channel quality profile may be used to determine the most effective modulation type and density at each frequency (step 1755). As an example, some modulation types may not provide the needed error performance given the quality of the channel at a given frequency. Thirdly, a set of frequencies and modulation types and densities for each frequency is selected that is sufficient to support the throughput requirements of the application (step 1760).

The throughput requirements of the application may be obtained in a variety of methods. In one example method, an indication of the required data bandwidth may be received from a source node.

In a typical embodiment of the present method, the determination of the most effective modulation type and density may be made by determining the densest modulation that can be supported at each frequency at a desired error performance at each time slot based on the channel quality determined at that frequency.

In another embodiment of the present invention, the set of frequencies and modulation types and densities is selected to provide the throughput needed by the application with the minimum resource requirements.

According to one embodiment of the present invention, the method by which communication of the selected frequencies and time slots to other nodes attached to the medium may be achieved by transmitting a broadcast message containing information about the selected channel resources.

Figure 18:
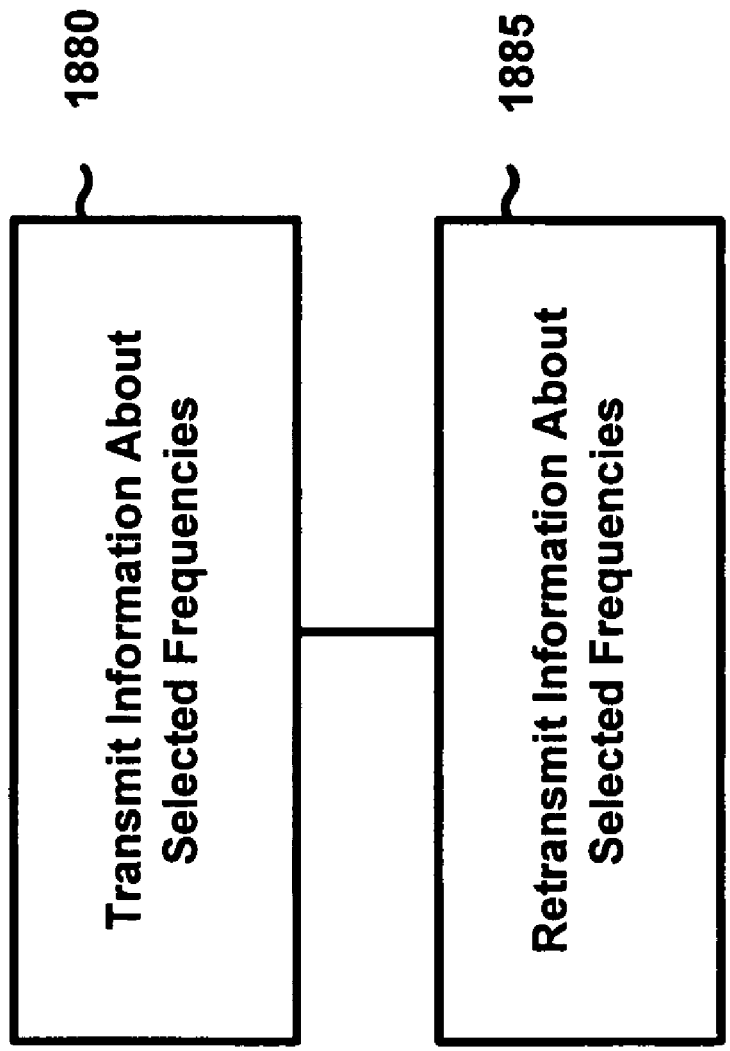

Other methods of communicating the selection of frequencies and time slots to other nodes attached to the medium may also be used. In one example method as shown in FIG. 18, the information about the selected frequencies and time slots is transmitted to a first node (step 1880), and the first node then retransmits this information to other nodes attached to the medium (step 1885).

Figure 19:
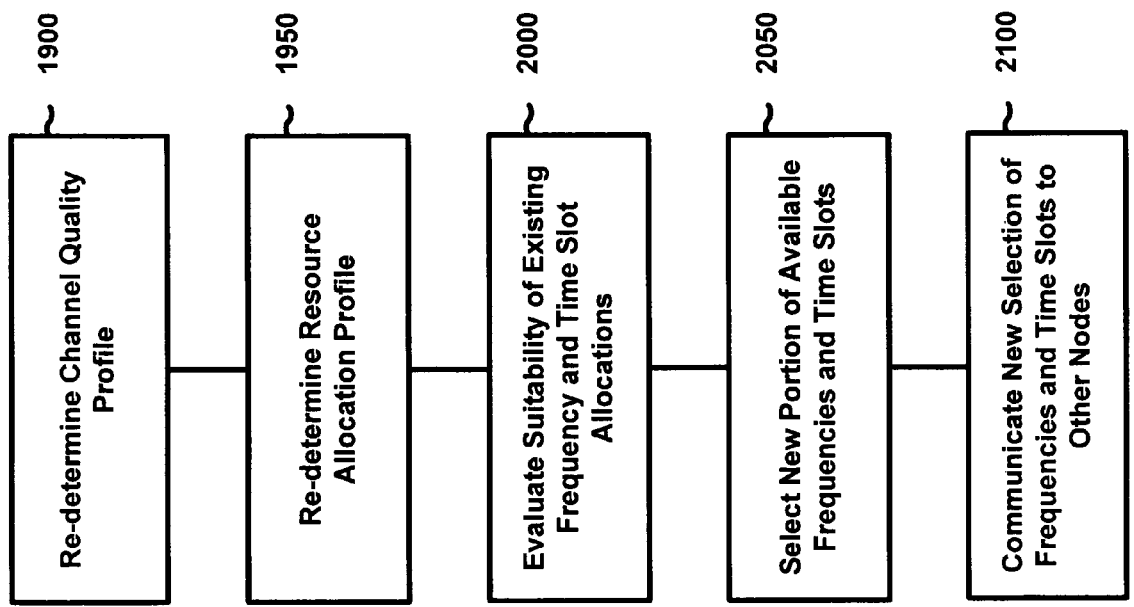

The channel quality may vary with time and thus decisions about selection of frequencies and time slots and modulation types and density may require modification from time to time in order to maintain the quality of service and throughput required by the application. In addition, other nodes may release resources that could be used to more effectively support another existing circuit connection on the network. Thus the method of the present invention may include the steps shown in FIG. 19 of re-determining the channel quality profile (step 1900), re-determining the resource allocation profile (step 1950), evaluating the suitability of the existing frequency and time slot allocations in light of any changes in the channel quality profile and/or the resource allocation profile (step 2000), selecting a new portion of the available frequencies and time slots for transmitting information to the destination node if the efficiency of resource allocation profile may be improved by a pre-determined amount (step 2050), and communicating the new selection of frequencies and time slots to other nodes attached to the medium (step 2100).

The present invention may further comprise a networking node that embodies the method of the present invention.

Figure 20:
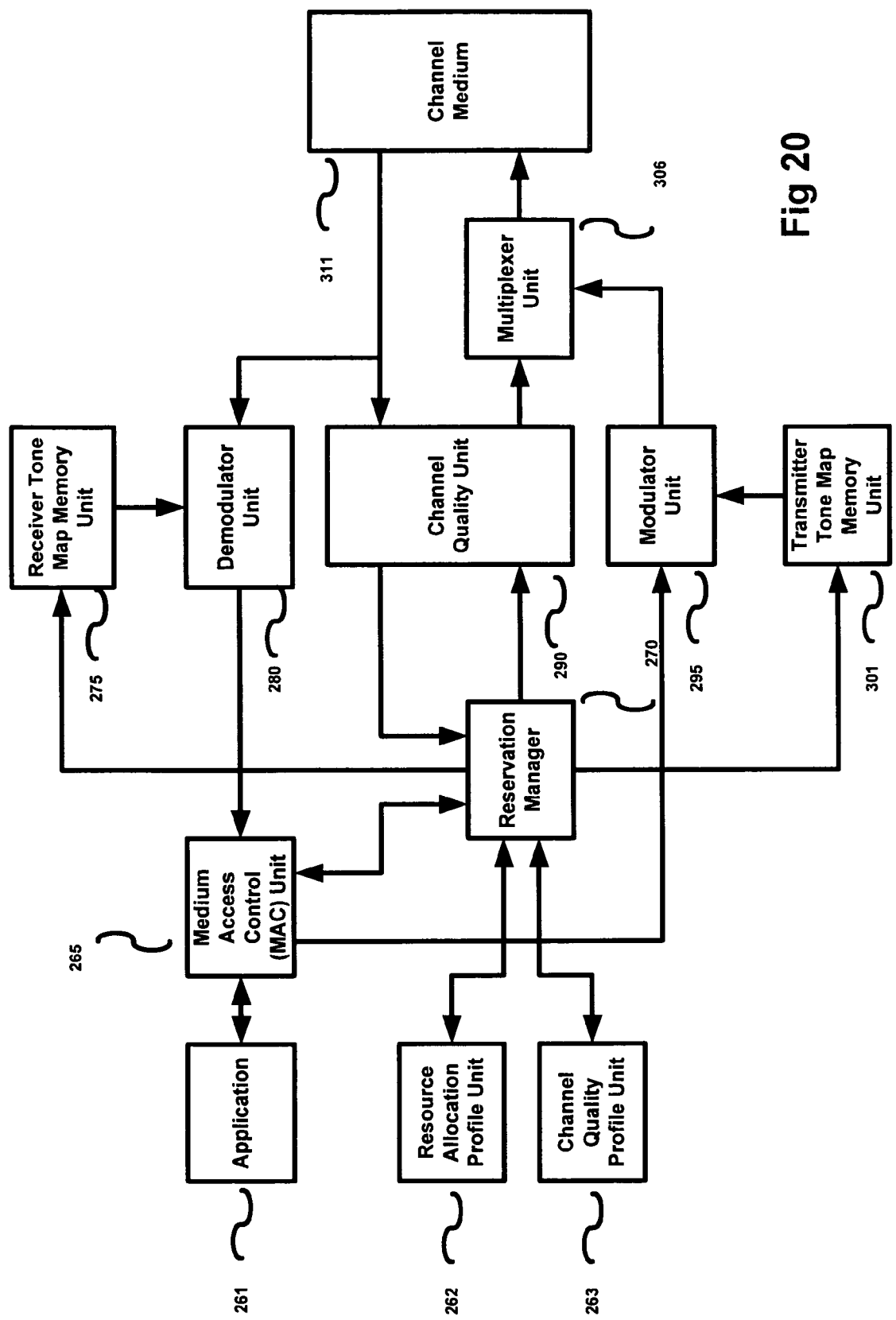
Figure 21:
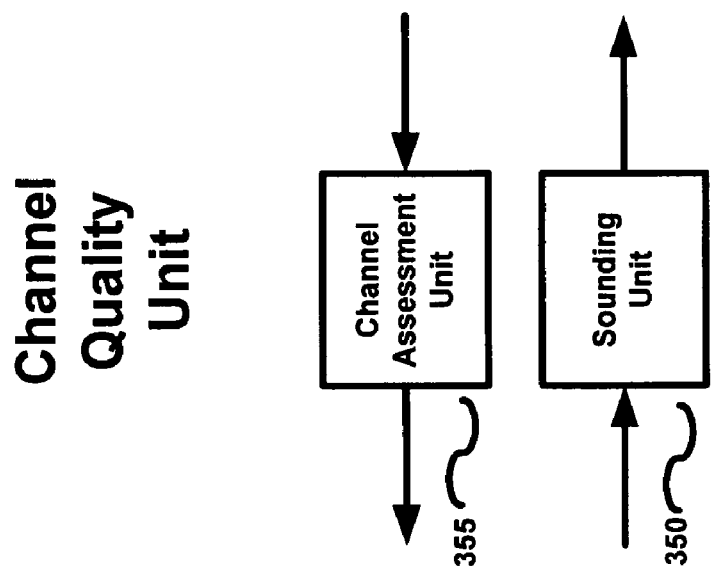
Figure 22:
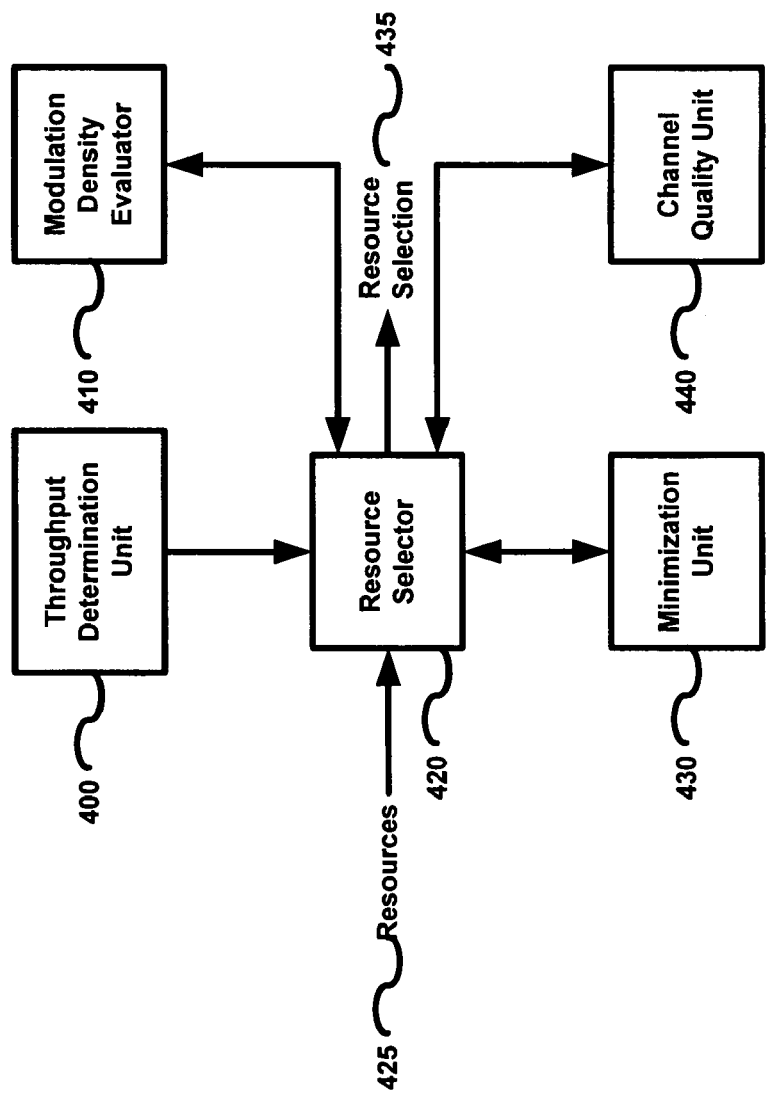

FIG. 20 is a block diagram that depicts the structure of one example embodiment of a networking node. A network typically has two or more such nodes attached to a channel medium 311. A resource allocation profile unit 262 determines existing frequency and time slot allocations on the medium. A reservation manager 270 selects a portion of the available frequencies and time slots according to information received from the resource allocation unit. A medium access control (MAC) unit 265 conveys an indicator of selected frequencies and time slots to the medium.

In one embodiment of the present invention, the demodulator unit 280 receives and demodulates transmissions from other nodes attached to the medium and passes the data contained in these transmissions to the MAC. The reservation management unit stores the frequency assignments and modulation types in use at each time interval in a receiver tone map memory unit 275 which is used to configure the demodulator unit. The MAC provides data to be transmitted to other nodes attached to the medium to a modulator unit 295, which modulates the data onto the selected carrier frequencies with the selected modulation type and density according to the contents of the transmitter tone map memory unit 301. The tone map memory contents are written by the reservation management unit.

The MAC unit exchanges data with the application 261, which might be a source or destination for computer data or a video source or destination. Any other data source or destination may also serve as the application.

Figure 23:
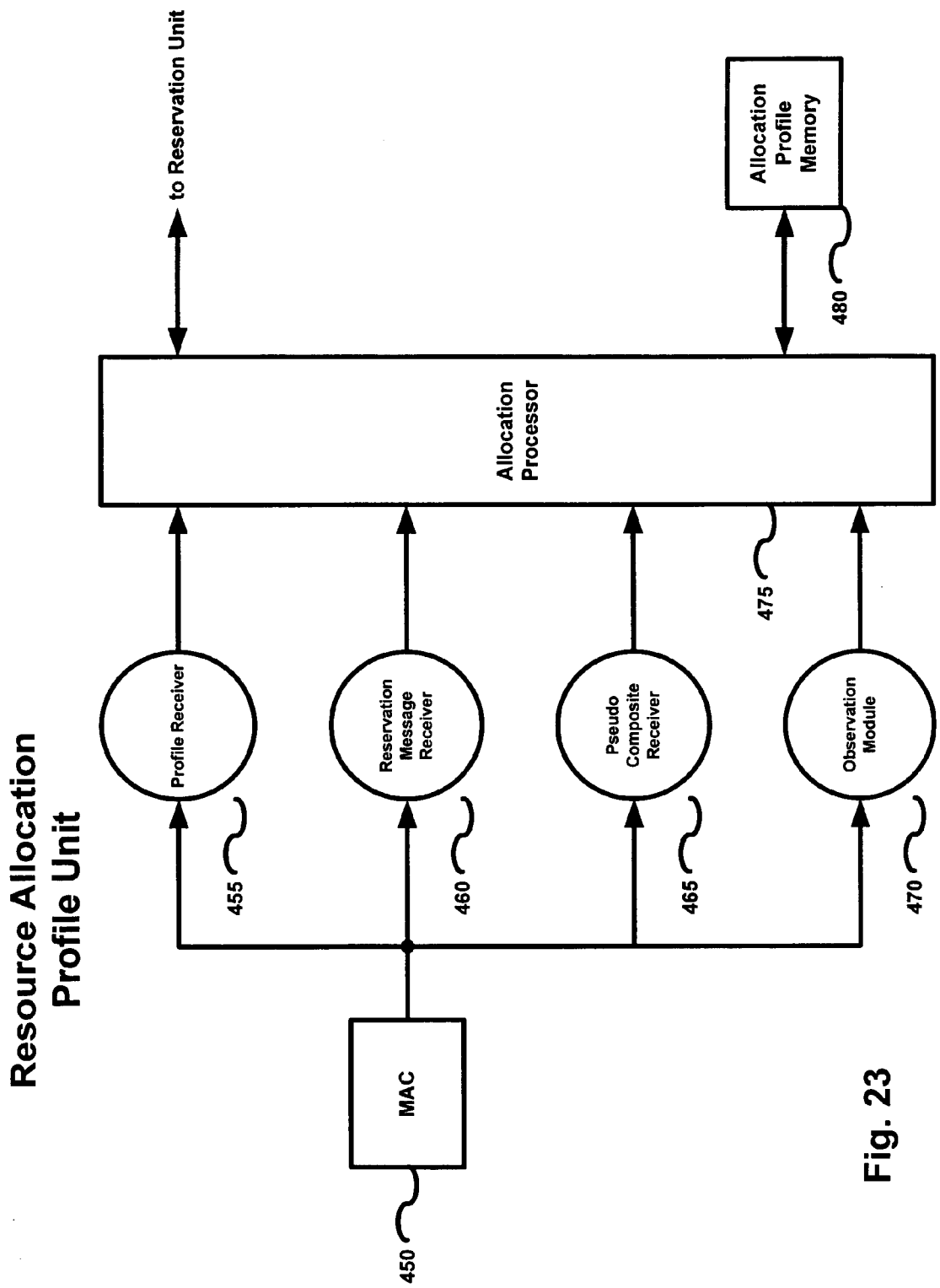

FIG. 23 depicts the resource profile allocation unit. Data from the MAC unit 450 may be accepted by one of either a profile receiver 455 capable of receiving a frequency and time slot allocation profile from the medium, a reservation message receiver 460 capable of receiving an individual frequency and time slot reservation message from the medium, a pseudo-composite frequency and time slot receiver 465 capable of receiving a pseudo-composite frequency and time slot allocation profile from the medium and an observation module 470 capable of generating a reservation indicator by observing activity on the medium. An allocation processor 475 compiles the results of these various profile sources and stores the resource allocation profile in the allocation profile memory 480. It provides the resource allocation profile to the reservation unit when requested.

What is claimed is:

1. A method for establishing a circuit connection over a network comprising the steps of:
    determining a resource allocation profile of frequencies and time slots in use on a medium connecting a source node and a destination node;
    selecting a portion of the frequencies and time slots from the resource allocation profile for transmitting information from the source node to the destination node, further comprising:
        determining a channel quality profile at each frequency of the selected portion;
        determining a throughput required to support a data rate requirement of an application that sources the information;
        determining a most effective modulation type and modulation density at
    each frequency of the selected portion according to the channel quality profile; and
        selecting a set of frequencies, modulation types and modulation densities for
    each frequency to support the required throughput; and
    communicating the selected portion of frequencies and time slots to nodes attached to the medium.

2. The method of claim 1 wherein the step of determining the resource allocation profile of frequencies and time slots further comprises forming a frequency and time slot allocation profile based on one or more of:
    frequencies and time slots received from one of the nodes attached to the medium,
    an individual frequency and time slot reservation message received from one of the nodes attached to the medium,
    a pseudo-composite frequency and time slot profile received from one of the nodes attached to the medium and
    observations of usage of the medium by the nodes attached thereto.

3. The method of claim 1 wherein the step of selecting a portion of the frequencies and time slots comprises selecting a portion of the frequencies and time slots in order to minimize an amount of resources required to accomplish the required throughput.

4. The method of claim 1 wherein the step of selecting a portion of the frequencies and time slots comprises selecting a portion of the frequencies and time slots in order to minimize an amount of resources required to accomplish a desired quality of service.

5. The method of claim 1 wherein the step of determining the channel quality profile at each frequency comprises one or more of:
    determining an attenuation of a channel at one or more frequency,
    determining a noise at one or more frequency,
    determining an interference at one or more frequency,
    determining a signal to noise ratio at one or more frequency,
    determining a variation of the attenuation of the channel with time at one or more frequency,
    determining a variation of the attenuation of the channel with frequency at one or more frequency,
    determining a variation of the phase response of the channel with time at one or more frequency and
    determining a variation of the phase response of the channel with frequency at one or more frequency.

6. The method of claim 1 wherein the step of determining the channel quality profile at each frequency comprises:
    sending a sounding signal from the source node to the destination node; and
    determining a quality of the sounding signal arriving at the destination node.

7. The method of claim 1 wherein the step of determining the throughput required to support the data rate requirement of an application comprises receiving a required data bandwidth indication from the source node.

8. The method of claim 1 wherein the step of determining the most effective modulation type and modulation density comprises the step of determining a densest modulation that can be supported at each frequency at a desired error performance at each time slot based on the channel quality profile.

9. The method of claim 1 wherein the step of selecting the set of frequencies, modulation types and modulation densities for each frequency comprises the step of selecting a set of frequencies and modulation types that provide the required throughput with minimum resource requirements.

10. The method of claim 1 wherein the step of communicating the selected portion of frequencies and time slots to the nodes attached to the medium comprises the step of transmitting a broadcast message containing information about the selected portion of frequencies and time slots.

11. The method of claim 1 wherein the step of communicating the selected portion of frequencies and time slots to the nodes attached to the medium comprises the steps of:
    transmitting information about the selected portion of frequencies and time slots to a first node; and
    retransmitting the information about the selected portion of frequencies and time slots from the first node to the other nodes attached to the medium.

12. The method of claim 1 further comprising the steps of:
    re-determining the channel quality profile at each frequency;
    re-determining the resource allocation profile;
    evaluating a suitability of the selected portion of frequencies and time slots in light of any changes in the channel quality profile and the resource allocation profile;
    selecting a new portion of the frequencies and time slots from the re-determined resource allocation profile for transmitting information from the source node to the destination node if an amount of resources may be reduced by a predetermined amount; and
    communicating the new selected portion of frequencies and time slots to the nodes attached to the medium.

13. A network node comprising:
    resource allocation profile unit capable of determining frequencies and time slots in use on a medium between a source node and a destination node;
    reservation manager capable of selecting a portion of the frequencies and time slots for transmitting information from the source node to the destination node according to information received from the resource allocation profile unit, the reservation manager further comprising:
        channel quality unit capable of determining a quality of the medium;

a throughput determination unit capable of determining the throughput required by an application that sources the information; and resource selector capable of selecting resources according to the quality and the required throughput; and medium access control unit capable of conveying an indicator of the selected portion of frequencies and time slots to the medium.

14. The network node of claim 13 wherein the resource allocation profile unit comprises:

profile receiver capable of receiving a frequency and time slot allocation profile from the medium and generating a profile, reservation message receiver capable of receiving an individual frequency and time slot reservation message from the medium and generating a profile, pseudo-composite frequency and time slot receiver capable of receiving a pseudo-composite frequency and time slot allocation profile from the medium and generating a profile and observation module capable of observing activity on the medium and generating a profile; and allocation processor capable of compiling one or more of the profiles from profile receiver, the reservation message receiver, the pseudo-composite frequency and time slot receiver, and the observation module, into an allocation profile, and storing the allocation profile in an allocation profile memory.

15. The network node of claim 13 wherein the reservation manager comprises a minimization unit that minimizes an amount of resources selected to accomplish the required throughput.

16. The network node of claim 13 wherein the reservation manager comprises a minimization unit that minimizes an amount of resources selected to accomplish a required quality of service.

17. The network node of claim 13 wherein the channel quality unit determines the quality of the medium by selecting one or more of:

attenuation unit capable of determining an attenuation of the medium at each of the frequencies and determining the quality of the medium, noise unit capable of determining a noise present on the medium at each of the frequencies and determining the quality of the medium, interference unit capable of determining an interference present on the medium at each of the frequencies and determining the quality of the medium, signal-to-noise unit capable of determining a signal-to-noise ratio on the medium at each of the frequencies and determining the quality of the medium, attenuation versus time variance unit capable of determining a variation of attenuation over time of the medium for each of the frequencies and determining the quality of the medium, attenuation versus frequency variance unit capable of determining a variation of attenuation over frequency of the medium for each of the frequencies and determining the quality of the medium, phase versus time variance unit capable of determining a variation of phase response over time of the medium for each of the frequencies and determining the quality of the medium and phase versus frequency variance unit capable of determining a variation of phase response over frequency of the medium for each of the frequencies and determining the quality of the medium.

18. The network node of claim 13 wherein the channel quality unit comprises a sounding unit capable of sending a sounding message from the source node to the destination node and receiving an indicator of sounding message quality from the destination node.

19. The network node of claim 13 wherein the resource selector is capable of selecting a set of frequencies and time slots that provide the required throughput with minimum resource requirements.

20. The network node of claim 13 wherein the medium access control unit is capable of conveying a broadcast message containing information about the selected portion of frequencies and time slots.

21. The network node of claim 13 wherein the medium access control unit is capable of conveying information about the selected portion of frequencies and time slots to a first node, wherein the medium access control unit is capable of re-transmitting the information about the selected portion of frequencies and time slots to the other nodes on the medium.

22. A network node comprising:

resource allocation profile unit capable of determining frequencies and time slots in use on a medium between a source node and a destination node;

reservation manager capable of selecting a portion of the frequencies and time slots for transmitting information from the source node to the destination node according to information received from the resource allocation profile unit, the reservation manager further comprising:

channel quality unit capable of determining a quality of the medium;

throughput determination unit capable of determining a throughput required by an application that sources the information;

modulation density evaluator capable of determining a most efficient modulation type and density at each frequency according to the channel quality profile; and a resource selector capable of selecting resources according to the most efficient modulation type and density and the required throughput and the quality; and medium access control unit capable of conveying an indicator of the selected portion of frequencies and time slots to the medium.

23. The network node of claim 22 wherein the resource allocation profile unit comprises:

profile receiver capable of receiving a frequency and time slot allocation profile from the medium and generating an profile, reservation message receiver capable of receiving an individual frequency and time slot reservation message from the medium and generating an profile, pseudo-composite frequency and time slot receiver capable of receiving a pseudo-composite frequency and time slot allocation profile from the medium and generating an profile; and observation module capable of observing activity on the medium and generating an profile; and allocation processor capable of compiling one or more profiles from the profile receiver, the reservation message receiver, pseudo-composite frequency and time slot receiver, and observation module, into an allocation profile, and storing the allocation profile in an allocation profile memory.

24. The network node of claim 22 wherein the reservation manager comprises a minimization unit that minimizes an amount of resources selected to accomplish the required throughput.

25. The network node of claim 22 wherein the reservation manager comprises a minimization unit that minimizes an amount of resources selected to accomplish a required quality of service.

26. The network node of claim 22 wherein the channel quality unit determines the quality of the medium by selecting one or more of:
- attenuation unit capable of determining an attenuation of the medium at each of the frequencies and determining the quality of the medium,
- noise unit capable of determining a noise present on the medium at each of the frequencies and determining the quality of the medium,
- interference unit capable of determining an interference present on the medium at each of the frequencies and determining the quality of the medium,
- signal-to-noise unit capable of determining a signal-to-noise ratio on the medium at each of the frequencies and determining the quality of the medium,
- attenuation versus time variance unit capable of determining a variation of attenuation over time of the medium for each of the frequencies and determining the quality of the medium,
- attenuation versus frequency variance unit capable of determining a variation of attenuation over frequency of the medium for each of the frequencies and determining the quality of the medium,
- phase versus time variance unit capable of determining a variation of phase response over time of the medium for each of the frequencies and determining the quality of the medium and
- phase versus frequency variance unit capable of determining a variation of phase response over frequency of the medium for each of the frequencies and determining the quality of the medium.

27. The network node of claim 22 wherein the channel quality unit comprises a sounding unit capable of sending a sounding message from the source node to the destination node and receiving an indicator of sounding message quality from the destination node.

28. The network node of claim 22 wherein the resource selector is capable of selecting a set of frequencies and time slots that provide the required throughput with minimum resource requirements.

29. The network node of claim 22 wherein the medium access control unit is capable of conveying a broadcast message containing information about the selected portion of frequencies and time slots.

30. The network node of claim 22 wherein the medium access control unit is capable of conveying information about the selected portion of frequencies and time slots to a first node, wherein the medium access control unit is capable of re-transmitting the information about the selected portion of frequencies and time slots to the other nodes on the medium.

31. A network node comprising:
- resource allocation profile unit capable of determining frequencies and time slots in use on a medium between a source node and a destination node;
- reservation manager capable of selecting a portion of the frequencies and time slots for transmitting information from the source node to the destination node according to information received from the resource allocation profile unit, the reservation manager further comprising:
  - channel quality unit capable of determining a quality of the medium;
  - modulation density evaluator capable of accepting a desired error
- performance and channel quality profile and determining a densest modulation that
- can be supported at each frequency and time slot; and
  - resource selector capable of selecting resources according to the densest modulation and the quality; and
- medium access control unit capable of conveying an indicator of the selected portion of frequencies and time slots to the medium.

32. The network node of claim 31 wherein the resource allocation profile unit comprises:
- profile receiver capable of receiving a frequency and time slot allocation profile from the medium and generating an profile,
- reservation message receiver capable of receiving an individual frequency and time slot reservation message from the medium and generating an profile,
- pseudo-composite frequency and time slot receiver capable of receiving a pseudo-composite frequency and time slot allocation profile from the medium and generating an profile; and
- observation module capable of observing activity on the medium and generating an profile; and
- allocation processor capable of compiling the profiles from the profiles receiver, the reservation message receiver, pseudo-composite frequency and time slot receiver, and observation module, into an allocation profile, storing the allocation profile in an allocation profile memory.

33. The network node of claim 31 wherein the reservation manager comprises a minimization unit that minimizes an amount of resources selected to accomplish a required throughput.

34. The network node of claim 31 wherein the reservation manager comprises a minimization unit that minimizes an amount of resources selected to accomplish a required quality of service.

35. The network node of claim 31 wherein the channel quality unit determines the quality of the medium by selecting one or more of:
- attenuation unit capable of determining an attenuation of the medium at each of the frequencies;
- noise unit capable of determining a noise present on the medium at each of the frequencies,
- interference unit capable of determining an interference present on the medium at each of the frequencies,
- signal-to-noise unit capable of determining a signal-to-noise ratio on the medium at each of the frequencies,
- attenuation versus time variance unit capable of determining a variation of attenuation over time of the medium for each of the frequencies,
- attenuation versus frequency variance unit capable of determining a variation of attenuation over frequency of the medium for each of the frequencies,
- phase versus time variance unit capable of determining a variation of phase response over time of the medium for each of the frequencies and
- phase versus frequency variance unit capable of determining a variation of phase response over frequency of the medium for each of the frequencies.

36. The network node of claim 31 wherein the channel quality unit comprises a sounding unit capable of sending a sounding message from the source node to the destination node and receiving an indicator of sounding message quality from the destination node.

37. The network node of claim 31 wherein the resource selector is capable of selecting a set of frequencies and time slots that provide a required throughput.

38. The network node of claim 31 wherein the medium access control unit is capable of conveying a broadcast message containing information about the selected portion of frequencies and time slots.

39. The network node of claim 31 wherein the medium access control unit is capable of conveying information about the selected portion of frequencies and time slots to a first node, wherein the medium access control unit is capable of re-transmitting the information about the selected portion of frequencies and time slots to the other nodes on the medium.

* * * * *

UNITED STATES PATENT AND TRADEMARK OFFICE
CERTIFICATE OF CORRECTION

PATENT NO. : 7,450,604 B2 Page 1 of 1
APPLICATION NO. : 10/422014
DATED : November 11, 2008
INVENTOR(S) : Steven H. Gardner and James E. Petranovich It is certified that error appears in the above-identified patent and that said Letters Patent is hereby corrected as shown below:

Title page Item [60] remove
"Continuation of application No. 09/044,644, filed on Mar. 18, 1998, now Pat. No. 6,567,122."

Signed and Sealed this

Seventeenth Day of February, 2009

JOHN DOLL
*Acting Director of the United States Patent and Trademark Office*